(12) United States Patent
Ellenby et al.

(10) Patent No.: US 6,414,696 B1
(45) Date of Patent: *Jul. 2, 2002

(54) GRAPHICAL USER INTERFACES FOR COMPUTER VISION SYSTEMS

(75) Inventors: John Ellenby; Thomas Ellenby; Peter Ellenby, all of San Francisco; Joseph Page, La Jolla, all of CA (US)

(73) Assignee: Geo Vector Corp., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/146,820

(22) Filed: Sep. 4, 1998

Related U.S. Application Data

(63) Continuation of application No. 08/662,219, filed on Jun. 12, 1996, now Pat. No. 6,037,936.

(51) Int. Cl.[7] .................................................. G06F 3/00
(52) U.S. Cl. ........................................ 345/762; 345/726
(58) Field of Search ................................. 345/326–358, 345/762, 763, 825, 826, 650, 661, 667, 656, 726, 725, 719, 720, 721, 722, 723, 724; 340/211–214; 707/10

(56) References Cited

U.S. PATENT DOCUMENTS

| | | | |
|---|---|---|---|
| 2,994,971 A | 8/1961 | Meisenheimer et al. ........ 35/44 |
| 3,729,315 A | 4/1973 | Conklin ........................ 96/27 |
| 3,769,894 A | 11/1973 | Conklin ........................ 95/85 |
| 3,923,370 A | 12/1975 | Mostron ....................... 350/55 |
| RE28,847 E | 6/1976 | Vizennor ..................... 350/302 |
| 4,218,702 A | * 8/1980 | Brocard et al. ......... 348/211 X |
| 4,425,581 A | 1/1984 | Schweppe et al. .......... 358/148 |
| 4,489,389 A | 12/1984 | Beckwith et al. ............ 364/522 |
| 4,600,200 A | 7/1986 | Oka et al. .................... 273/313 |
| 4,645,459 A | 2/1987 | Graf et al. ..................... 434/43 |
| 4,684,990 A | 8/1987 | Oxley ........................ 358/183 |
| 4,736,306 A | 4/1988 | Christensen et al. ........ 364/513 |
| 4,835,532 A | 5/1989 | Fant ........................... 340/728 |
| 4,855,822 A | 8/1989 | Narendra et al. ........... 358/103 |
| 4,940,972 A | 7/1990 | Mouchot et al. ............ 340/747 |
| 4,959,721 A | * 9/1990 | Micic et al. ................ 348/211 |
| 4,970,666 A | 11/1990 | Welsh et al. ................. 364/522 |
| 5,034,812 A | 7/1991 | Rawlings .................... 358/108 |
| 5,072,218 A | 12/1991 | Spero ........................ 340/980 |
| 5,115,398 A | 5/1992 | De Jong ..................... 364/443 |
| 5,164,827 A | * 11/1992 | Paff ....................... 348/211 X |
| 5,182,641 A | 1/1993 | Diner et al. ................ 358/103 |
| 5,252,950 A | 10/1993 | Saunders et al. .............. 345/9 |
| 5,296,854 A | 3/1994 | Hamilton et al. ........... 340/980 |
| 5,311,203 A | 5/1994 | Norton ........................... 345/7 |
| 5,353,134 A | 10/1994 | Michel et al. ................ 359/52 |
| 5,394,517 A | 2/1995 | Kalawsky .................... 395/129 |
| 5,410,649 A | 4/1995 | Gove ......................... 395/161 |

(List continued on next page.)

OTHER PUBLICATIONS

The Insight Group, *Developing Visualization Software Applications* pp. 214–270, 1995.*

* cited by examiner

Primary Examiner—Steven Sax
(74) Attorney, Agent, or Firm—Page Lohr

(57) ABSTRACT

Computer vision systems provide a user a view of a scene whereby an image of the scene may have been augmented with information generated by a computer. Computer vision systems of the present invention include graphical user interfaces which have been discovered to operably interact with geometric constructs of a user environment, objects within a scene, perspective of the scene, image features of a signal which represents the scene, among others. These graphical user interfaces of the invention do not behave as those known because operation of these interfaces depends on properties and features particular to computer vision systems which have position and attitude determining means.

29 Claims, 54 Drawing Sheets

U.S. PATENT DOCUMENTS

| | | | | |
|---|---|---|---|---|
| 5,450,140 A | * | 9/1995 | Washino | 348/211 X |
| 5,467,444 A | | 11/1995 | Kawamura et al. | 395/141 |
| 5,479,597 A | | 12/1995 | Fellous | 395/154 |
| 5,528,232 A | | 6/1996 | Verma et al. | 340/825.54 |
| 5,625,765 A | * | 4/1997 | Ellenby et al. | 348/211 X |
| 5,675,358 A | * | 10/1997 | Bullock et al. | 345/115 |
| 5,675,753 A | * | 10/1997 | Hansen et al. | 345/666 |
| 5,742,521 A | * | 4/1998 | Ellenby et al. | 348/211 X |
| 5,754,808 A | * | 5/1998 | Tanaka et al. | 345/762 |
| 5,774,122 A | * | 6/1998 | Kojima et al. | 345/763 |
| 5,793,367 A | * | 8/1998 | Taguchi | 345/330 |
| 5,815,411 A | * | 9/1998 | Ellenby et al. | 348/211 X |
| 5,883,639 A | * | 3/1999 | Walton et al. | 345/473 |
| 6,037,936 A | * | 3/2000 | Ellenby et al. | 345/339 |
| 6,044,181 A | * | 3/2000 | Steliski et al. | 382/284 |

GRAPHICAL USER INTERFACES FOR COMPUTER VISION SYSTEMS

This application is a Continuation of Ser. No. 08/662,219 filed Jun. 12, 1996 now U.S. Pat. No. 6,037,936.

BACKGROUND OF THE INVENTION

1. Field

The present discovery and invention relate generally to graphical user interfaces for computer systems and relate in particular to graphical user interfaces for special computer vision systems, sometimes and herein known as "Augmented Reality™" computer vision systems. Graphical user interfaces of the invention find great novelty in their interaction, responsiveness and function related to these highly specialized computer vision systems.

A clear and complete description of computer vision systems has been disclosed as U.S. pending patent application having a Ser. No. 08/119,360. In addition, some basic and preliminary description of graphical user interfaces as they may particularly relate to computer vision systems appears in the disclosure U.S. pending patent application having a Ser. No. 08/307,360. Further, other concepts and ideas relating to graphical user interfaces, were presented in disclosure U.S. pending patent application having a Ser. No. 08/411,299. Each of those three pending U.S. patent applications is believed to contain considerably useful information as it may relate to the present invention. Accordingly, each of those documents is incorporated herein this disclosure, by reference thereto.

In agreement with provisions of 35 U.S.C. §120, this application is a Continuation-in-Part type application. It continues from Ser. No. 08/411,299, filed Mar. 27, 1995; which in turn continues from Ser. No. 08/119,360, filed Sep. 10, 1993, both remain pending as of this even date.

2. Prior Art

A graphical user interface is a computer generated graphical device which a computer user may employ to interact with, or command, a computer system to take some action or actions. A commonly recognized graphical user interface is known quite well to most computer users as a "Menu". One example of a Menu includes a list of option selections presented in a simple list box. A user may select an option by pointing a cursor to it via a pointing device. Some pointing devices include: a mouse, a trackball, and scrolling keys or other tactile means. Pressing "enter" or "clicking" a mouse button while a cursor is pointing to a selection then commands the computer to execute a function associated with the option selected.

Various types of Menus have been configured to interact with a user in different ways. Sometimes, and depending upon the application being run on a computer, one type of Menu may provide better function than another type. Two common types are discussed here to illustrate how a graphical user interface may preferentially interact with a particular application. A "pop-up" type Menu and a "drop-down" type Menu each act differently; each having certain cooperation with respect to the application which the computer is running.

A "pop-up" type Menu may be initiated by some event in a computer program. It typically interrupts normal program activity. For example, if a computer error occurs, a "pop-up" Menu may appear in the middle of a display screen and offer a user the options: "continue" or "start over".

In comparison, a "drop-down" Menu is typically initiated by request of a user. For example, an icon on a "tool bar" may indicate a group of tasks related to a common feature. Stimulating ("pointing and clicking") the icon causes a Menu box to drop down therefrom and into the display area. The Menu may have a list of possible command options which are selectable by a user. "Pop-up" type Menus, therefore, cooperate better with internal or automatic mechanisms which may initiate them and "drop-down" Menus may be better suited for functions which are initiated by a user. These are only a few of the many features well known in the arts of computer graphical user interface design.

Sometimes an application which a computer is running suggests a certain type of graphical user interfaces. Very elegantly designed "drop-down" Menus having advanced features are used with sophisticated drawing programs. Examples which thoroughly illustrate this are the Menus employed by the CorelDRAW!™ drawing software packages. Those having experience with advanced drawing software packages will appreciate how clever Menu configuration may greatly enhance the ease-of-use and efficiency of the application.

There exists many fundamental differences between the display of a simple personal computer and the display of a computer vision system. A computer vision system may employ an electronic camera and a computer graphics generator to formulate augmented images of real scenes in real-time. Composite images presented at the display of a computer vision system may be comprised of optically acquired images having been modified or augmented with computer generated graphics. The computer generated graphics may relate to objects detected (or otherwise "known" by the computer) in the scene being addressed In particular, some objects are identified by their known location. The objects may be graphically simulated by, and superimposed onto "real" or optically acquired images of the objects.

It may be desirable for the user to command a computer vision system to perform various functions. Standard Menus, or other graphical user interfaces, can be employed by computer vision systems to provide for user interface function. However, since computer vision systems behave very differently than common computer systems, Menus which might be most useful in computer vision systems are heretofore completely unknown.

Particular function and features associated with computer vision systems which are not found in common computer systems suggest graphical user interfaces may be uniquely arranged to cooperate with those functions and features particular to those specialized systems. The present inventors have now discovered some very useful and valuable configurations of graphical user interfaces as they may particularly apply to computer vision systems. These new graphical user interfaces provide surprising results when considering the benefits they may provide to users of computer vision systems which employ them. The new graphical user interfaces tend to facilitate operation, enhance functionality, improve interpretation of images, increase understanding of scenes. These graphical user interfaces operate in a way which is not and cannot be used with prior systems.

SUMMARY OF THE INVENTION

A graphical user interface system has been invented to interact with features and function which are particular to computer vision systems.

Computer vision systems having augmented images may have a graphical user interface configured to appear to interact with real objects of a scene. A graphical user interface may be arranged to interact with the pointing direction of the computer vision system. Graphical user interfaces may be responsive to position and/or attitude as determined by the computer vision system. Graphical user interfaces may be responsive to a cursor which corresponds to a camera boresight indicator. Many configurations of graphical user interfaces which are particular to computer vision systems exist. These are presented in detail in the sections here following. When a computer vision system includes graphical user interface devices, the interaction of the graphical user interfaces with respect to elements of the system can produce some surprising results. The present invention is concerned with how graphical user interfaces may be arranged to interact with computer vision systems and elements thereof.

Comparison to a Simple Computer

A fundamental difference between a simple computer and a computer vision system is that displayed images in the computer vision system correspond directly to some view of the real world. Images are aligned to the scene in real time. A computer vision system addresses a scene as its camera axis is pointing toward it. The computer vision system has associated with it at all times, a position and attitude which are easily measurable and thus "known" to the computer. As a result, displayed images are presented in a certain perspective which corresponds to the point-of-view of the computer vision system and the user's position. The displayed images of a simple computer are not generally associated with its surrounding environment nor aligned to any scene.

Besides using the computer vision system pointing direction as an interface pointer, a graphical user interface may be arranged to respond to the pointing direction of the computer vision system when the boresight is not acting as a pointer. A graphical user interface might respond to the absolute pointing direction.

The "pointing direction" of a computer vision system is a primary feature which should be well understood. The pointing direction will be shown to have great interaction with various graphical user interfaces. Not only does the pointing direction sometimes serve as an interface pointing cursor but the absolute pointing direction may influence the behavior of certain graphical user interfaces.

graphical user interfaces of the invention can be made to be responsive to a new type cursor or "pointer". Operations known as "point-and-click" and "drag-and-drop" were heretofore performed with a computer peripheral pointer known as a "mouse", "track ball", or "powerpoint". Each of these devices allow a user to cause a pointing icon or "pointer" to traverse a display field. When the icon is collocated with something of interest in the displayed image, an object, image or another icon for example, then some action can be initiated by the computer program. The pointer of a computer vision system may include a conventional pointer which moves in response to a tactile stimulus, or might by arranged such that it corresponds to the vision system boresight. By pointing the computer vision system in any direction, a user causes the boresight to be collocated with some part of the displayed image. By pointing the computer vision system at objects of interest, the use might indicate commands to the computer. Use of a vision system boresight as a pointer is believed to be a completely new concept.

For example, a drop-down Menu may be associated or "attached" to some object of the scene. The position of the graphical user interface is made to correspond at all times with the apparent position of the object. When the pointing direction of the vision system is panned across a horizon, objects in the scene appear on a display to move laterally. A Menu associated with a particular object can be made to appear to follow the object's lateral motion so that the graphical user interface stays with the object to which it is attached. Even if the object leaves the field-of-view of the vision system, so can the drop-down Menu. When the object is again acquired by the system (comes again into the field-of-view), then so does the drop down Menu. This example illustrates that a graphical user interface may interact in real time with the pointing direction of the computer vision system. i.e. when the pointing direction is adjusted, the graphical user interface responds to the adjustment.

In addition, the absolute location of the computer vision system may dictate the behavior of certain graphical user interfaces. If the computer vision system is in Paris, graphical user interfaces may automatically be presented in the French language. Similarly, if the computer vision system is determined to be in New York, then graphical user interfaces may automatically be presented in the English language. It is quite possible that the combination of both position and attitude of the computer vision system may affect the behavior of graphical user interfaces. It is further possible that the display field periphery may be enabled such that it might operate on a graphical user interface. Other features and function particular to computer vision systems can be exploited to advance the usefulness and suggest arrangements of graphical user interfaces for computer vision systems. The example above shows how pointing direction might affect a graphical user interface, some further examples directed to position, position and attitude, magnification are briefly mentioned here. Some specific examples follow.

Position

A simple example shows how position alone might dictate the graphical user interface content and behavior of a graphical user interface. Since a graphical user interface may be an icon of arbitrary shape, it is possible that a small map in the shape of a state's boundary be displayed with images of scenes being addressed. As the computer vision system is moved from state-to-state, the map could change shape to correspond to the state that it is in. As a user crosses the border from Kansas City, Miss. to Kansas City, Kans., a Missouri shaped icon would become a Kansas shaped icon.

Position and Attitude

Under some circumstances, both position and attitude of a computer vision system are used to create a special version of a graphical user interface. If a scene includes a particular object for example a billboard, then the billboard will appear in a different perspective for every location from which it may be viewed. It may be desirable to have a graphical user interface appear in the same perspective as the billboard. To accomplish this, a determination of the computer vision system position and attitude enables the computer to compute the proper perspective associated with any place from which the billboard may be viewed or addressed by the system. The graphical user interface can then be displayed in a perspective which corresponds to the perspective of the billboard. Thus, both position and attitude of the computer vision system may affect the arrangement of a graphical user interface of the invention.

Magnification

Computer vision systems have very sophisticated zoom properties, graphical user interfaces of computer vision systems may aid in serving zoom objectives of those systems. A graphical user interface may be arranged such that its content may include magnified images of scenes being addressed, while the display field contains a non-magnified image.

From the Image Signal

The electronic image signal generated by the camera may be probed by the computer to detect some feature. From this information a graphical user interface may be generated to aid in understanding and interacting with the detected feature.

To fully appreciate the invention, one should have a complete understanding of computer vision systems of the type which produce augmented images of real scenes. Full disclosure of those systems has been made, referenced and incorporated herein this document. A brief review follows; however, one cannot be expected to completely understand this disclosure without full understanding of the references as significant elements herein are defined at length in those presentations. Therefore, thorough review of the incorporated documents is highly recommended.

A Brief Review of Computer Vision System Concepts

Computer vision systems may be comprised of a camera, a computer, a display and position and attitude determining means. The system addresses a scene and produces at the display an augmented image thereof. The augmented image is comprised of image information from two sources. A first image source is the camera which optically acquires an image of a scene and produces an electronic image signal. The second source is a computer generated image source. From position and attitude measurements, the computer identifies a scene and objects therein. The computer may recall from memory, models which are related to identified objects and assembles a computer generated image having a perspective which matches the true perspective of the scene from the point-of-view of the computer vision system in real time. Optically acquired images are combined with computer generated images to form composite or "augmented" images. An augmented image is presented to a user on a display having a display field aligned to the scene being addressed. A user views the "real" world where the display of the computer vision system appears to be a "window" at which the user looks. A user finds great benefit because the "window" may contain image information about the real world in true scale and proper perspective. This information may additionally contain objects which are not readily visible to the naked eye or the electronic camera as the computer generates portions of the final image.

Objects of the Invention

It is a primary object of the invention to provide graphical interface to computer systems.

It is a further object to provide graphical user interfaces to computer vision systems.

It is still further an object to provide new graphical user interfaces.

It is an object of the invention to provide new function to graphical user interfaces.

It is an object to provide graphical user interfaces which are responsive to objects and features in augmented images.

It is an object to provide graphical user interfaces which are responsive to computer vision system functions, features, and properties.

It is an object to provide graphical user interfaces which are responsive to position or attitude, or both, of computer vision systems.

In accordance with these objectives, certain preferred examples including the best modes anticipated are presented herefollowing in great detail with clear description having references to drawing figures.

BRIEF DESCRIPTION OF THE DRAWING FIGURES

Figure 13:
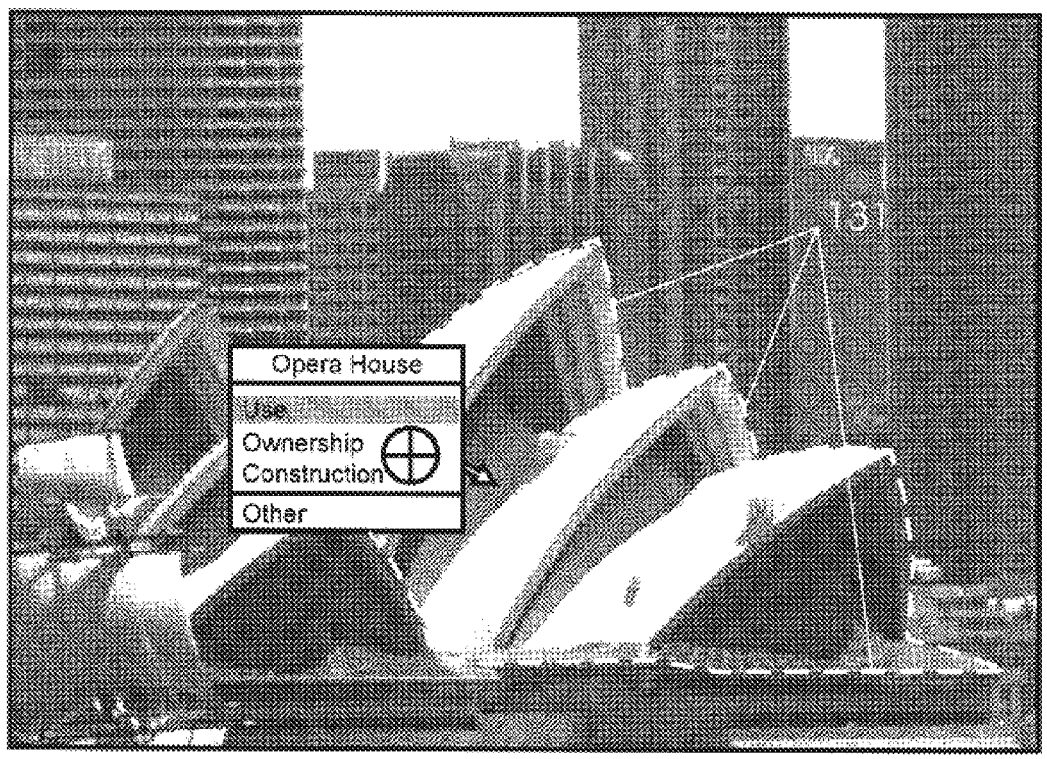
Figure 14:
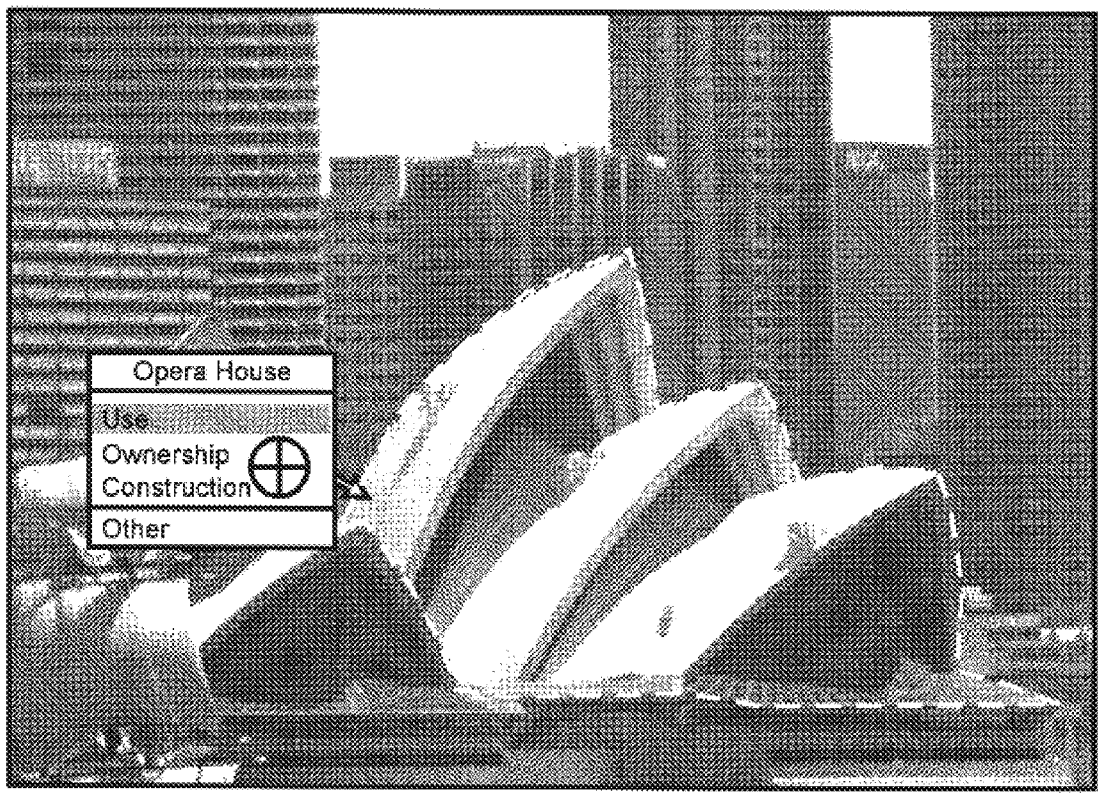

FIGS. 13–14 contains an image relating to another scheme of positioning a graphical user interface within an image field.

Figure 15:

FIG. 15 is an image having a graphical user interface which is responsive to a user's position as that position may relate to the scene.

Figure 16:
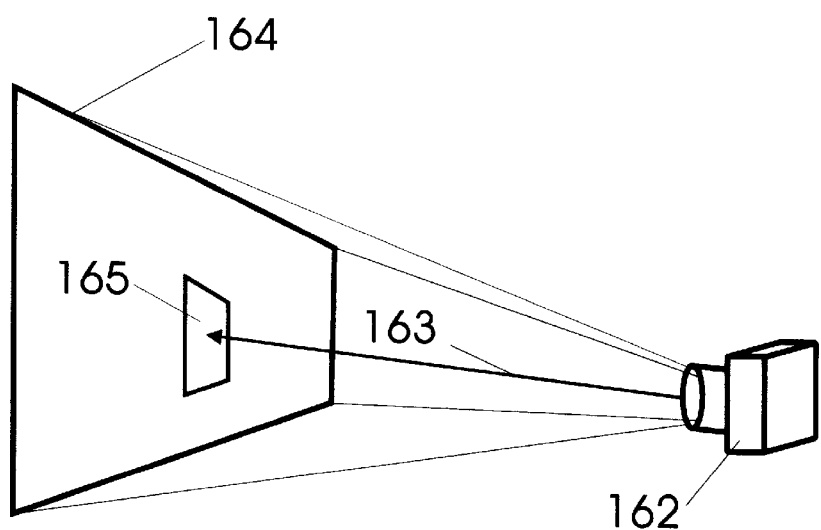
Figure 16:
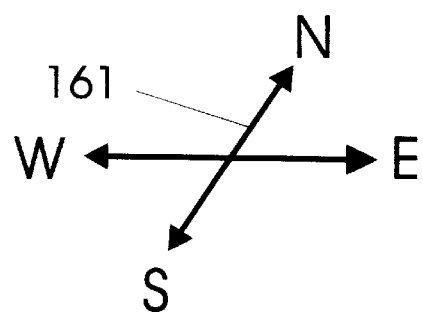

FIG. 16 shows a computer vision system, the apparent location of a graphical user interface with respect to a scene, and scene geometry having a relationship with the compass.

Figure 17:
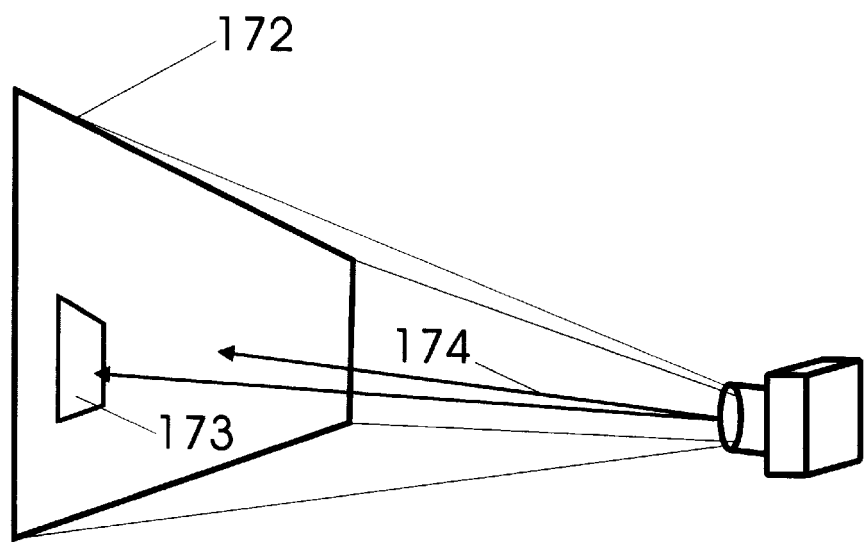
Figure 17:
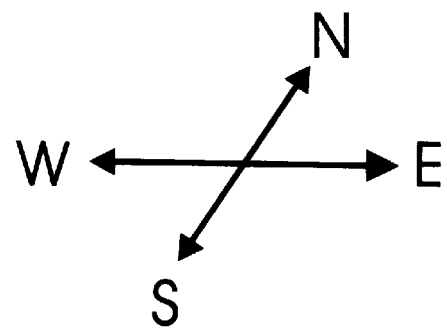

FIG. 17 similarly shows the geometry and the result of a displacement in pointing direction.

Figure 18:
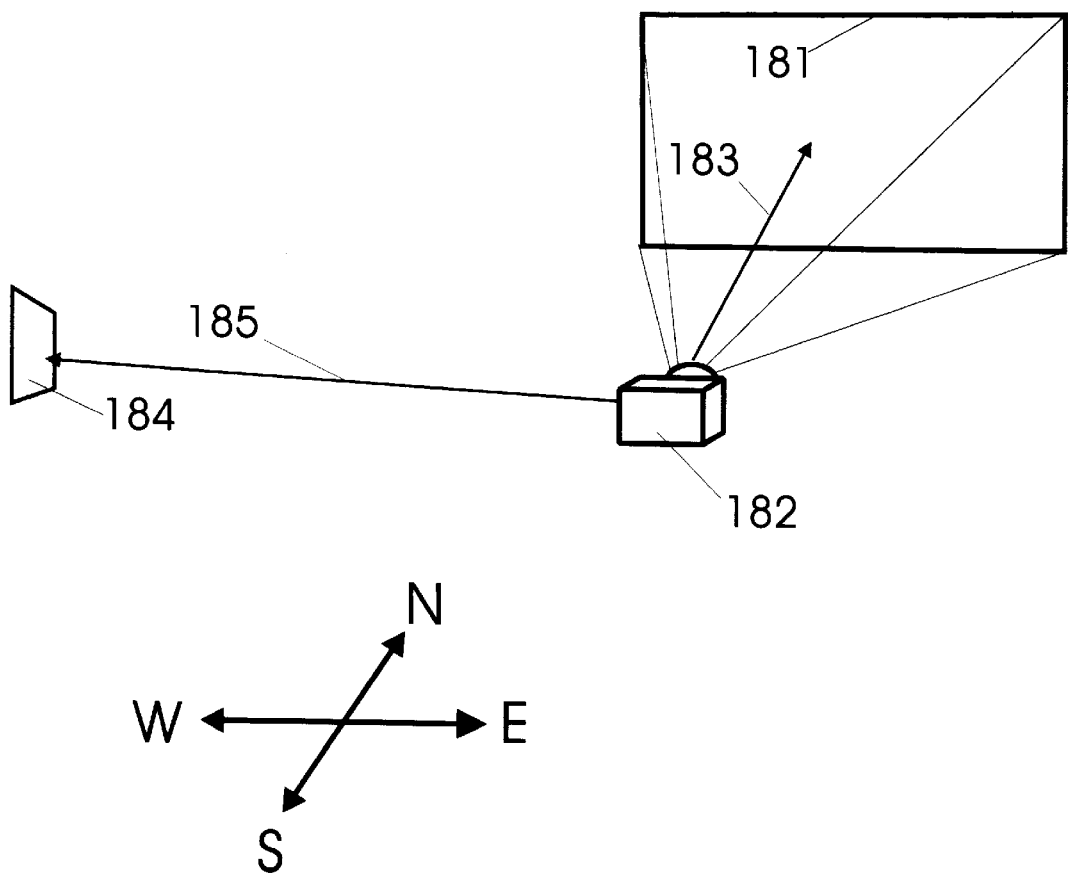

FIG. 18 similarly shows a large displacement and the result with respect to the graphical user interface.

Figure 19:
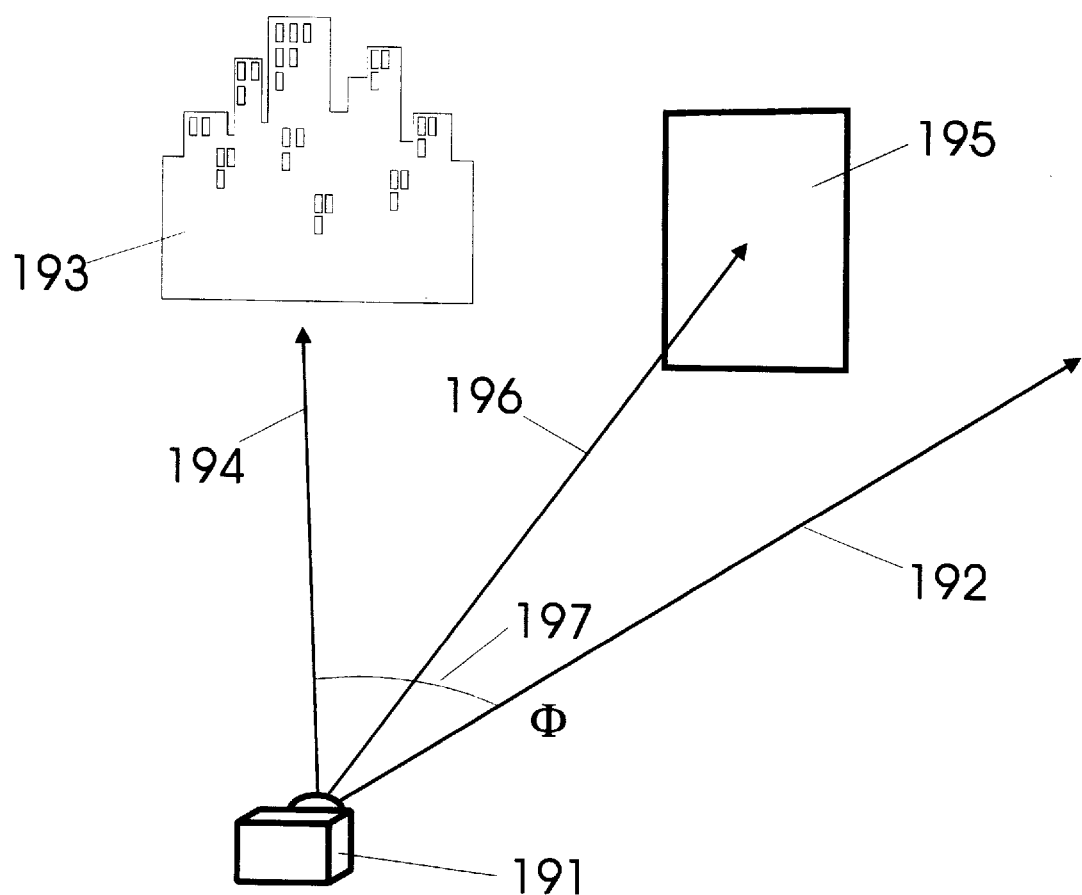

FIG. 19 shows a geometry which relates to a dynamically positioned graphical user interface.

Figure 20:
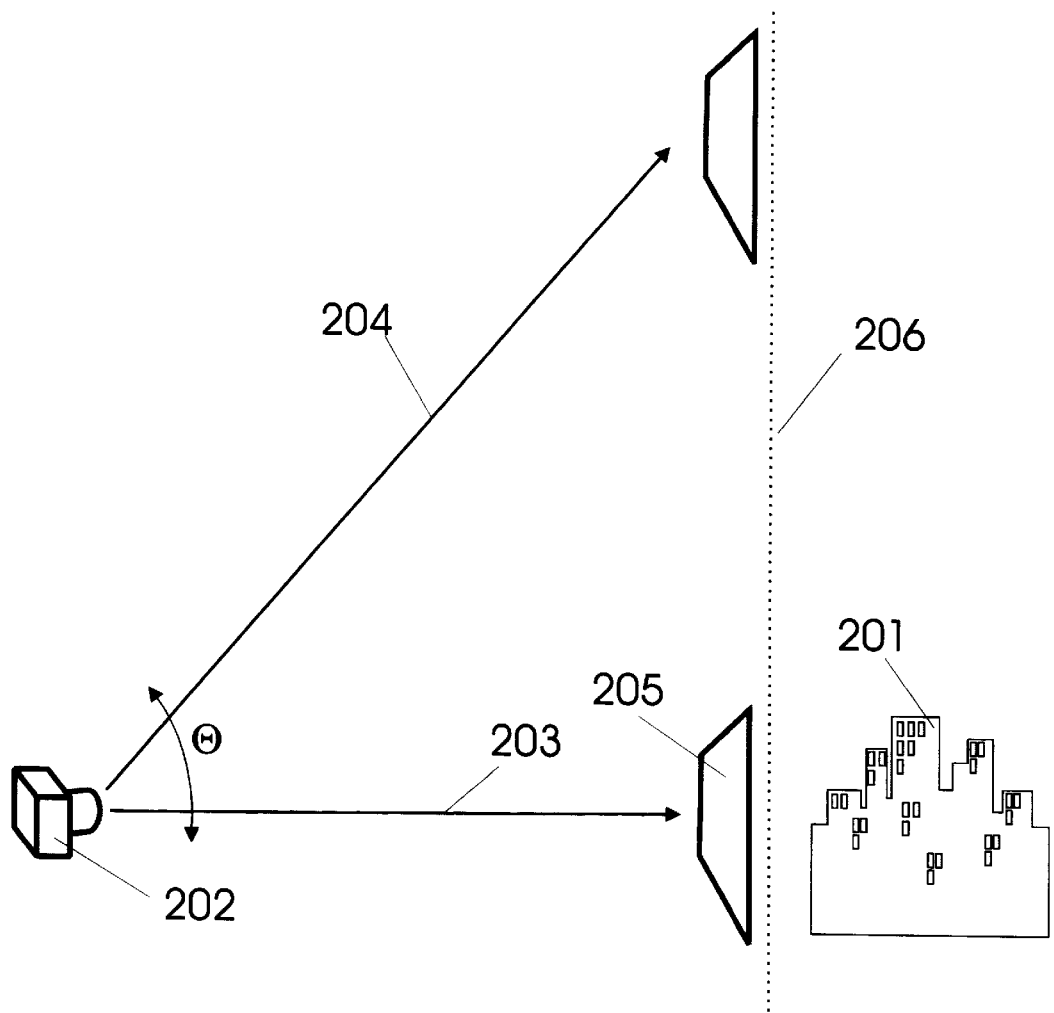

FIG. 20 shows a geometry which includes a geometric construct of the scene being imaged, i.e. a plane, and a graphical user interface which may be displayed to appear in that plane.

Figure 21:
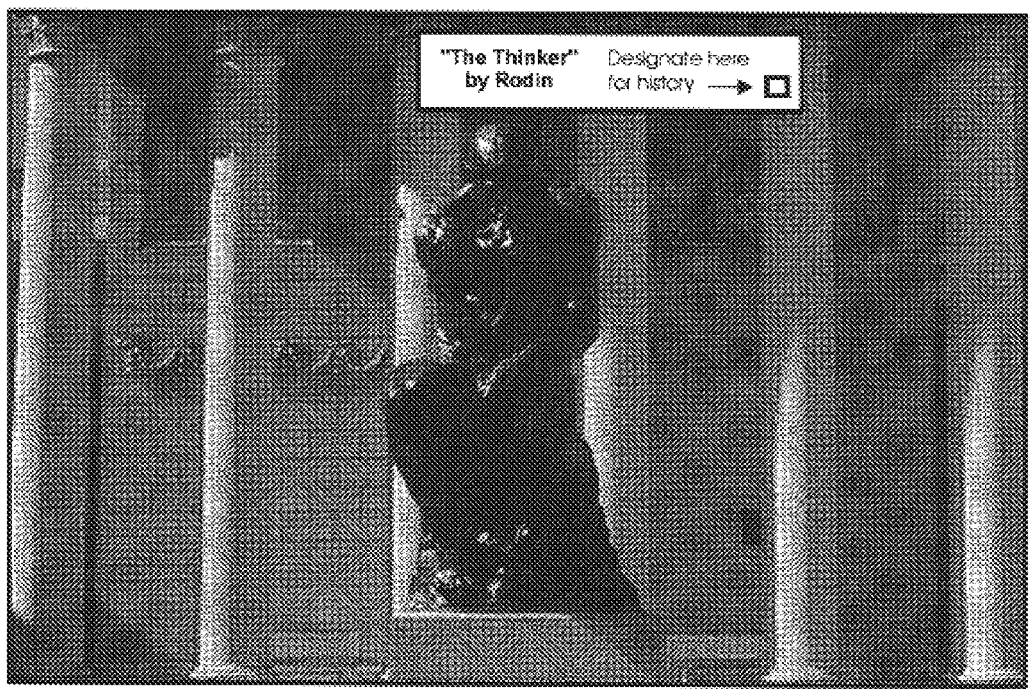

FIG. 21 is an image of a object from a particular point-of-view where the graphical user interface appears to face normally the viewer of the image.

Figure 22:
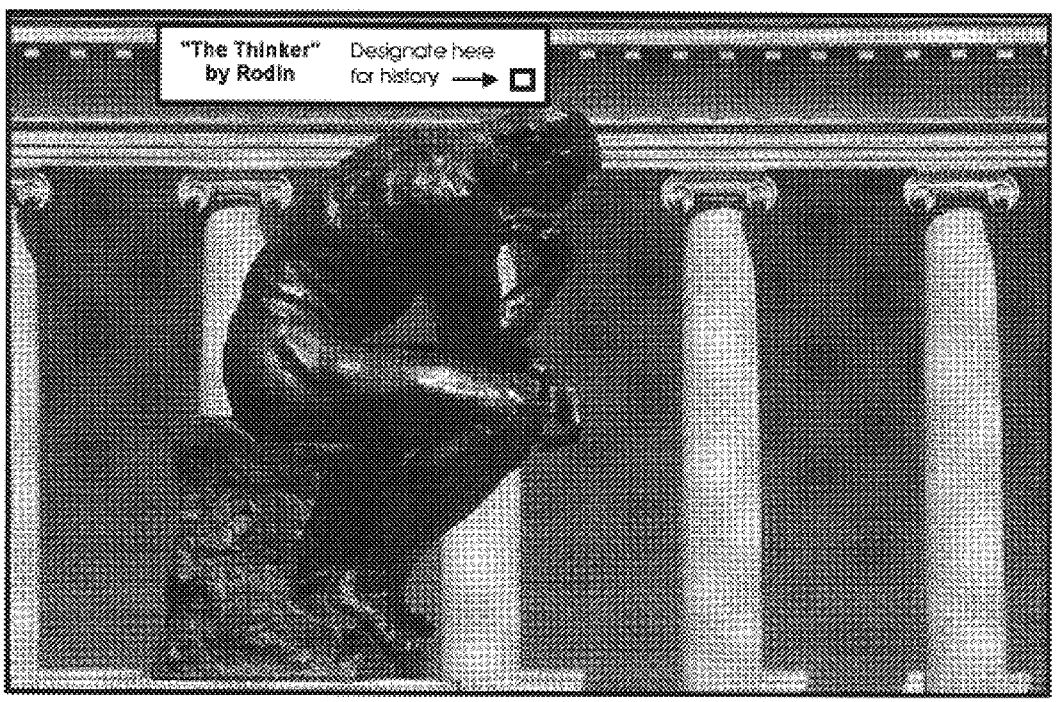

FIG. 22 is a second image of the object of FIG. 21, from a different and orthogonal point-of-view, where the graphical user interface still appears to face normally the viewer of the scene from that second point-of-view.

Figure 23:
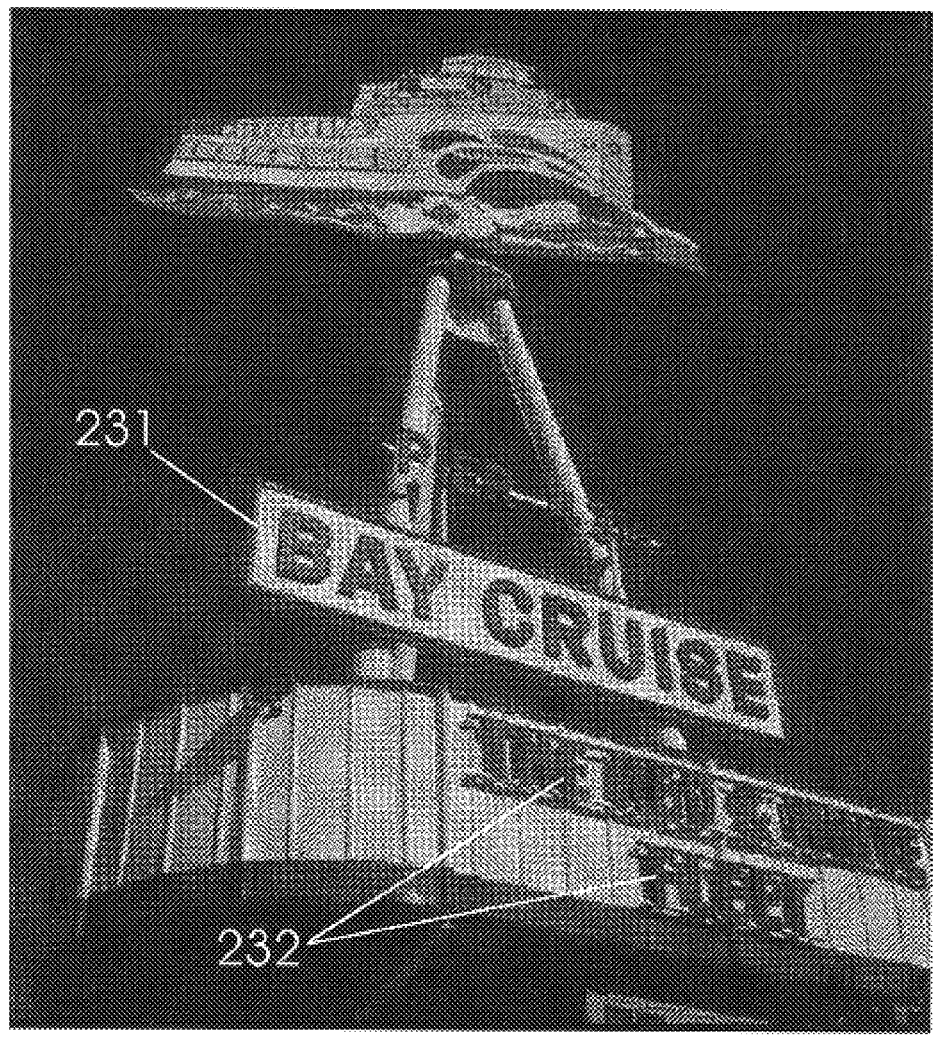

FIG. 23 is an image of a publicity sign promoting a business service, the sign being in a perspective particular to the location from which it is being addressed.

Figure 24:

FIG. 24 is a second image of the sign where a graphical user interface has been added to the image in a perspective which matches the perspective of the sign as it appears from the point-of-view of the user.

Figure 25:

FIG. 25 is a third image of the sign where a second graphical user interface is presented as a sub-field of the first graphical user interface.

Figure 26:
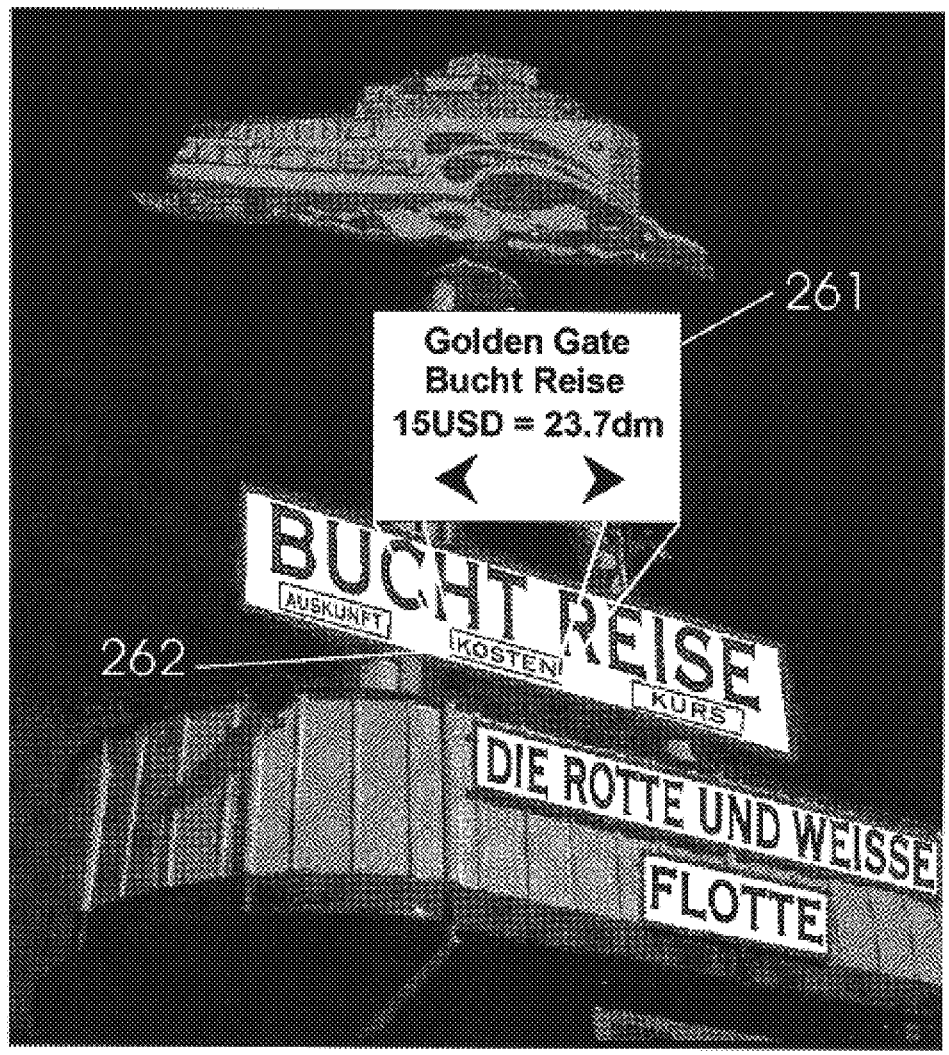

FIG. 26 similarly is an image of the sign where a second graphical user interface is presented as a sub-field of the first graphical user interface.

Figure 27:
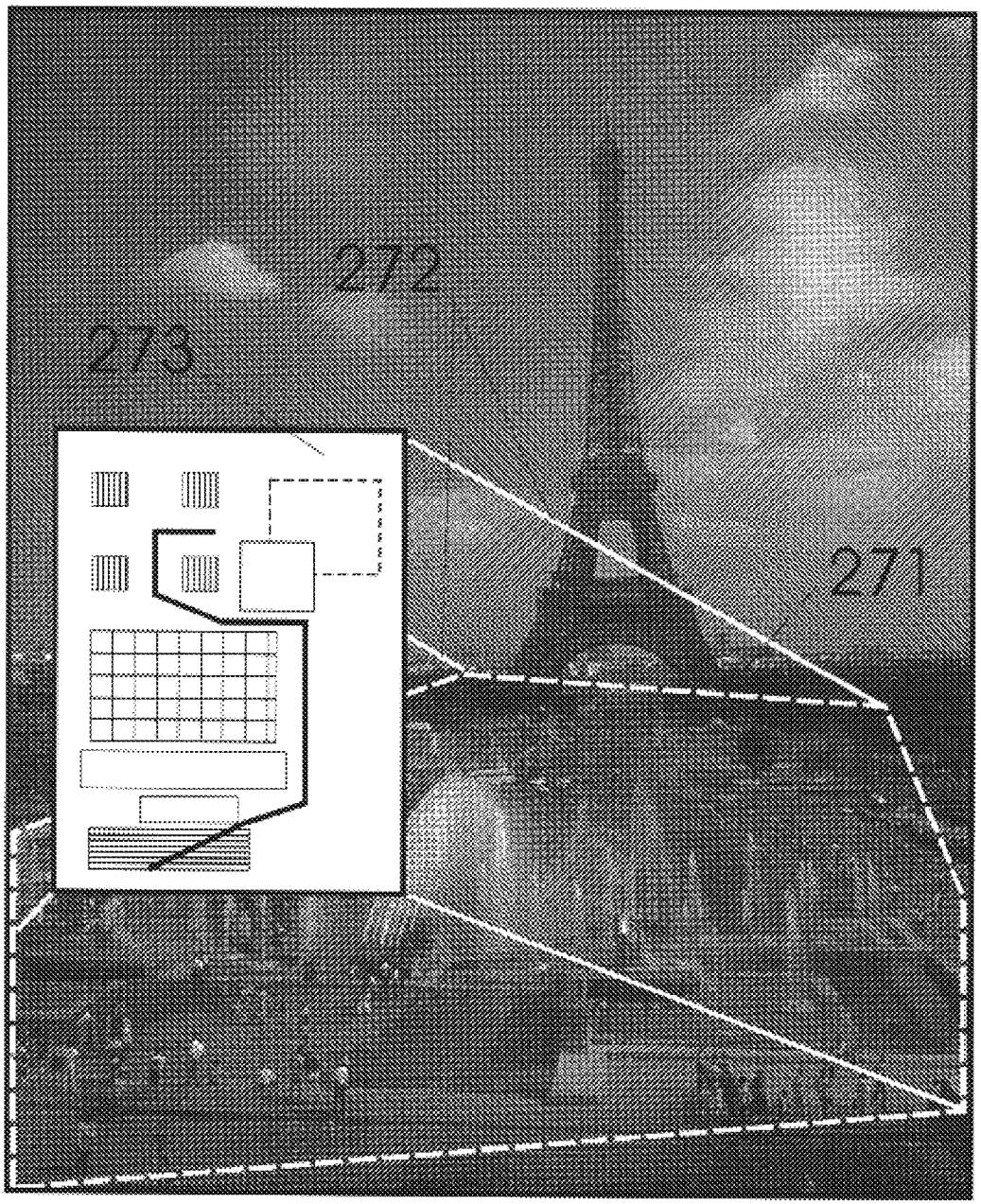

FIG. 27 shows an image having a graphical user interface supported by indicia which is positioned in the display field in accordance with a spatial between the graphical user interface and the scene being addressed.

Figure 28:
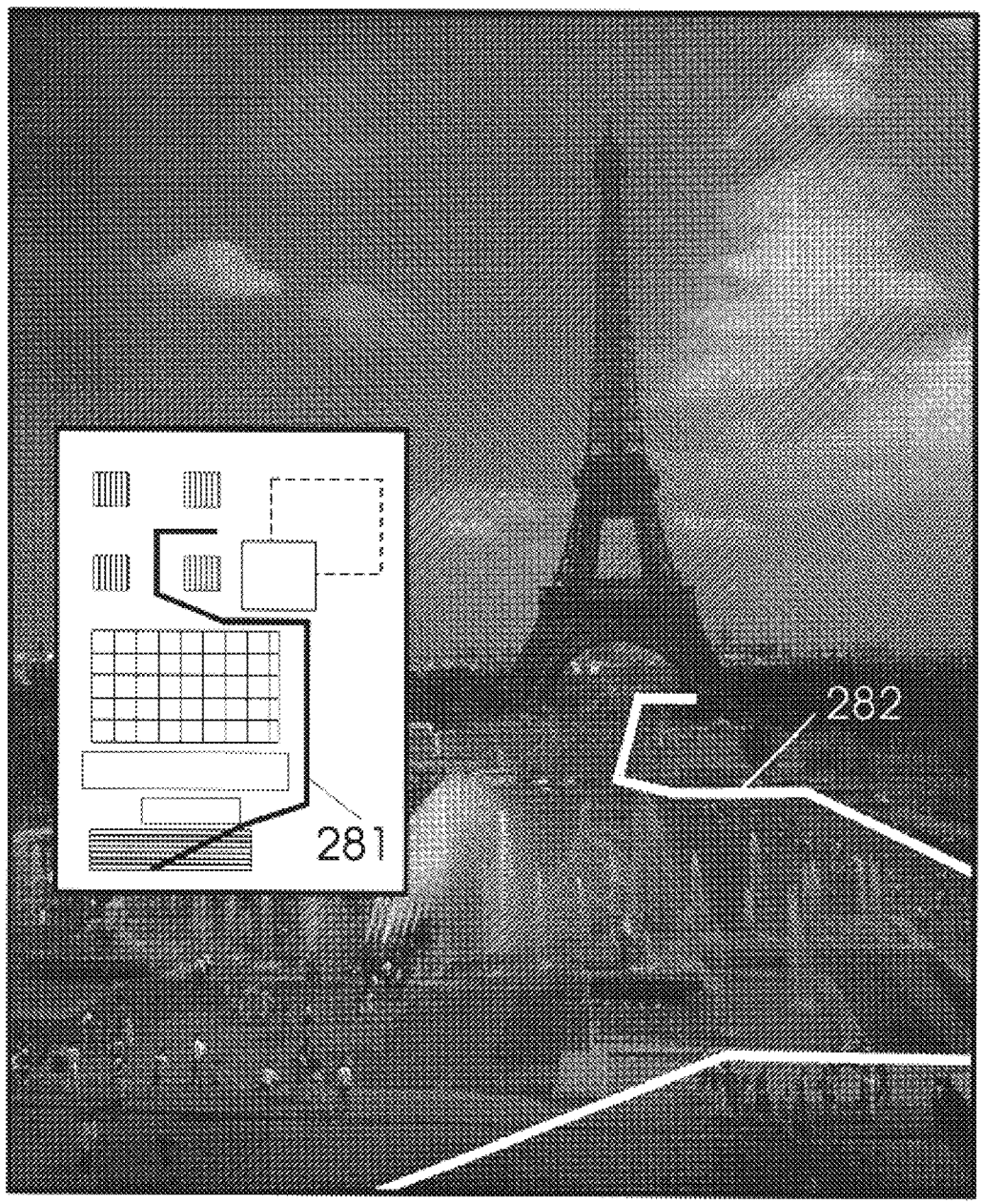

FIG. 28 similarly shows an image having a graphical user interface where indicia is positioned in the image in accordance with a spatial relationship with parts of the graphical user interface.

Figure 29:
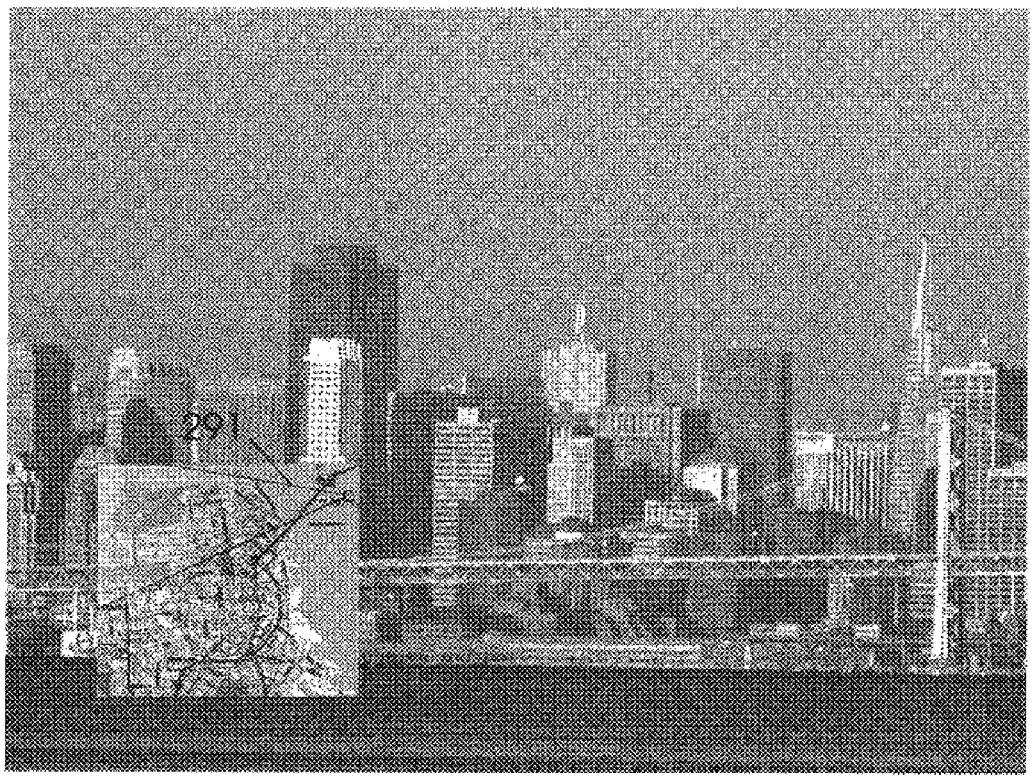

FIG. 29 illustrates a scheme whereby indicia is used in a graphical user interface to translate spatial information relating to physical properties of the computer vision system into a visual form.

Figure 30:
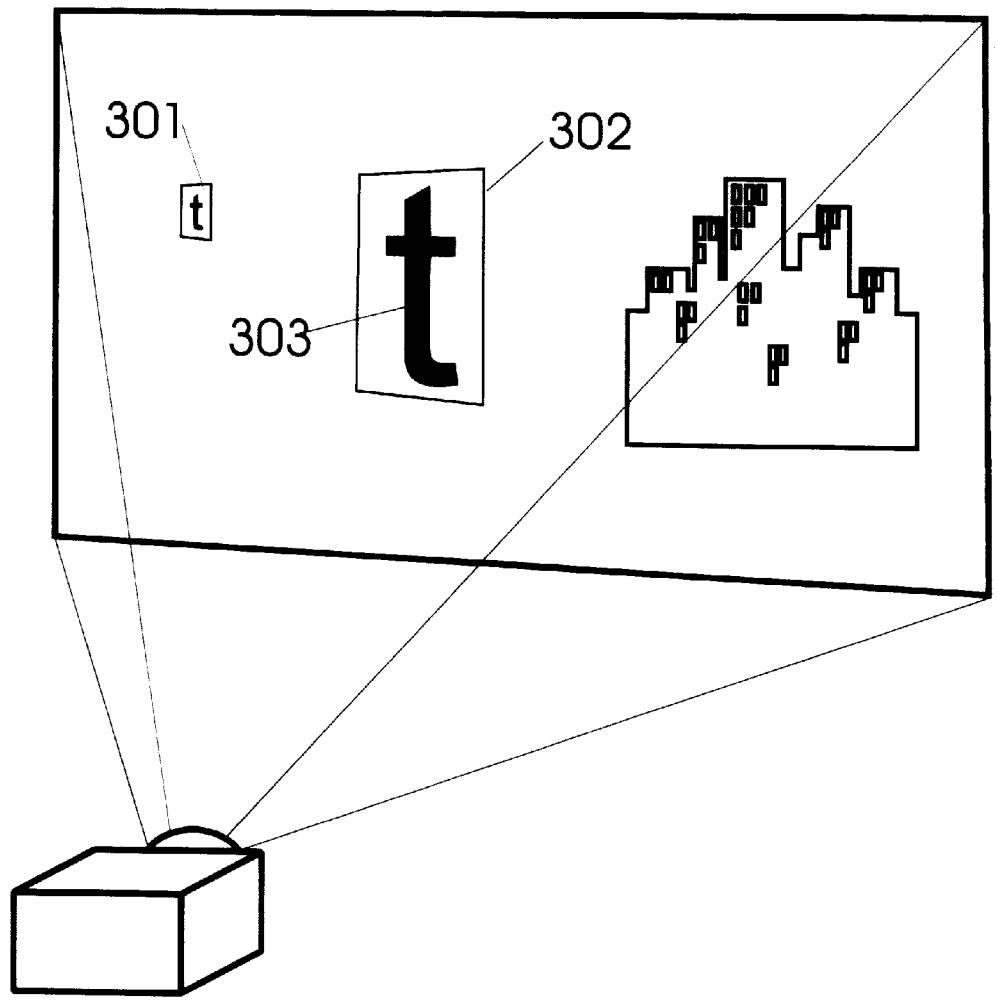

FIG. 30 demonstrates a magnification mechanism relating to graphical user interfaces.

Figure 31:
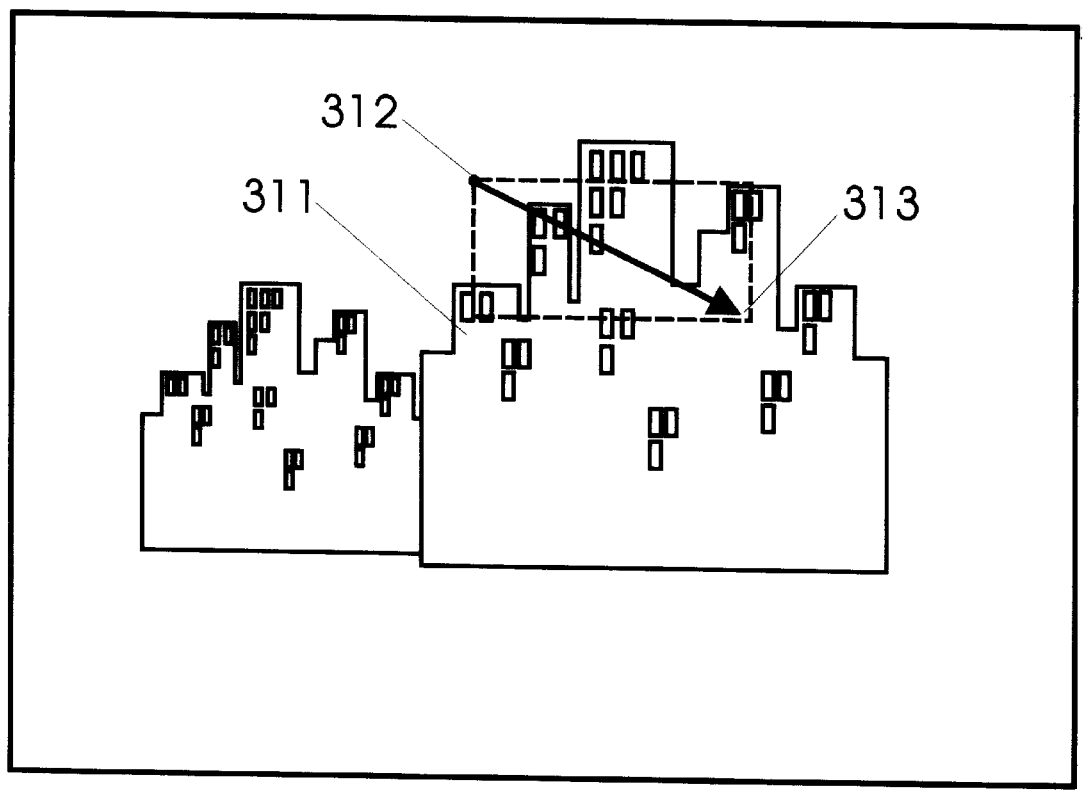

FIG. 31 shows a "drop-and-drag" operation as it relates to a zoom graphical user interface.

Figure 32:
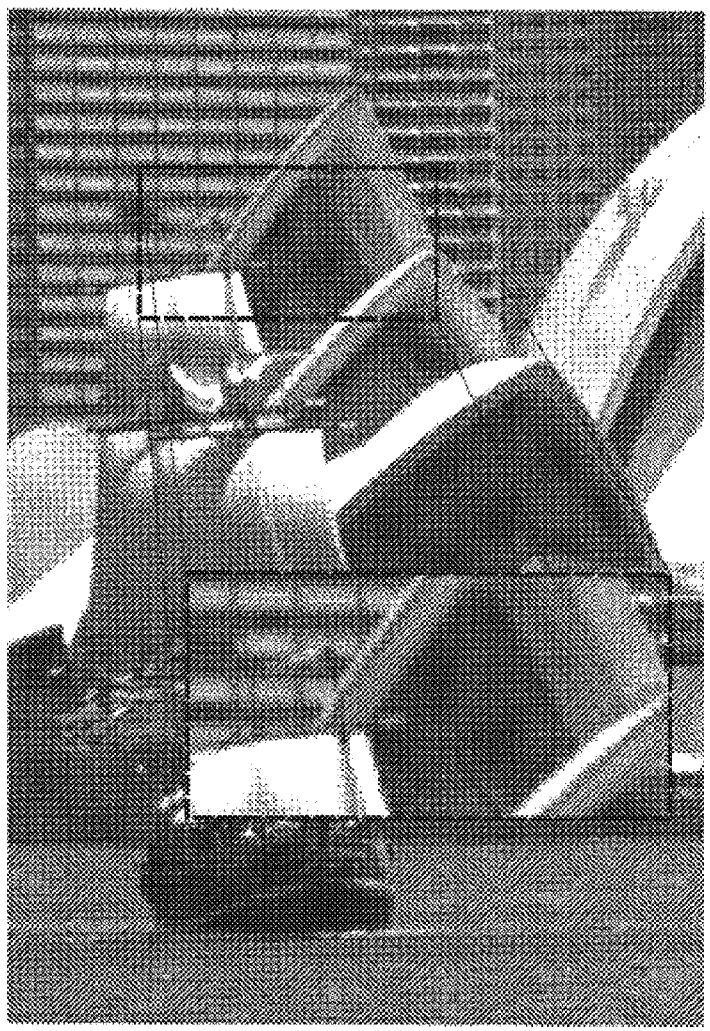

FIG. 32 is an image of a scene containing a graphical user interface where the content of the interface contains a magnified image of a portion of the scene being addressed.

FIGS. 33–36 contain a series of four images of a specialized graphical user interface which is responsive to the display field extremities.

Figure 37:
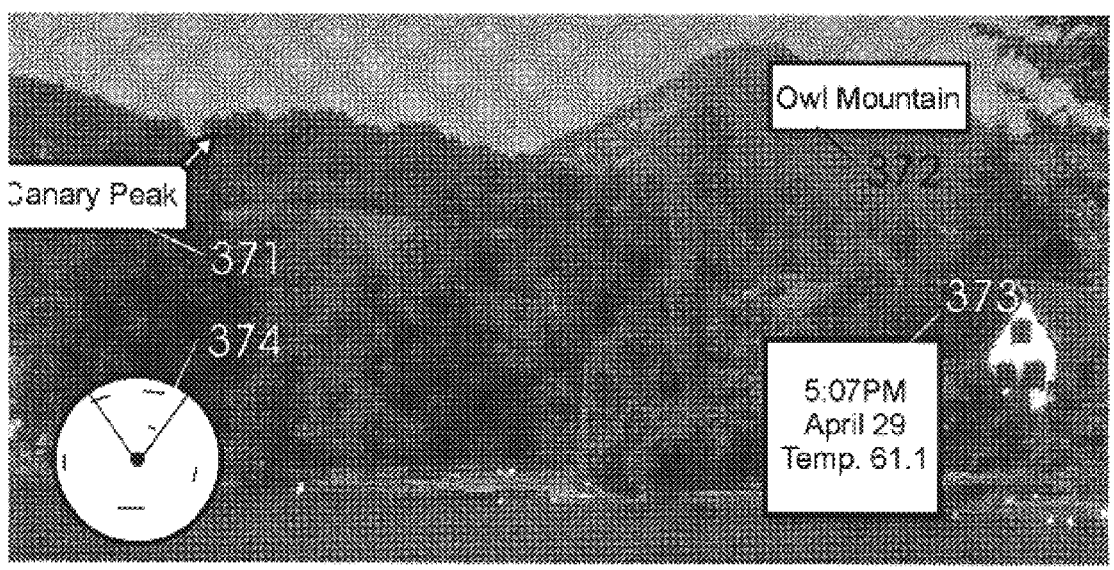

FIG. 37 shows a graphical user interface which catalogs other graphical user interfaces with respect to their position in relation to the user's position.

Figure 38:

FIG. 38 shows a similar graphical user interface which catalogs other graphical user interfaces with respect to position and perspective.

Figure 39:

FIG. 39 shows a similar graphical user interface having in combination therewith, a map to further detail the position of certain graphical user interfaces.

Figure 40:
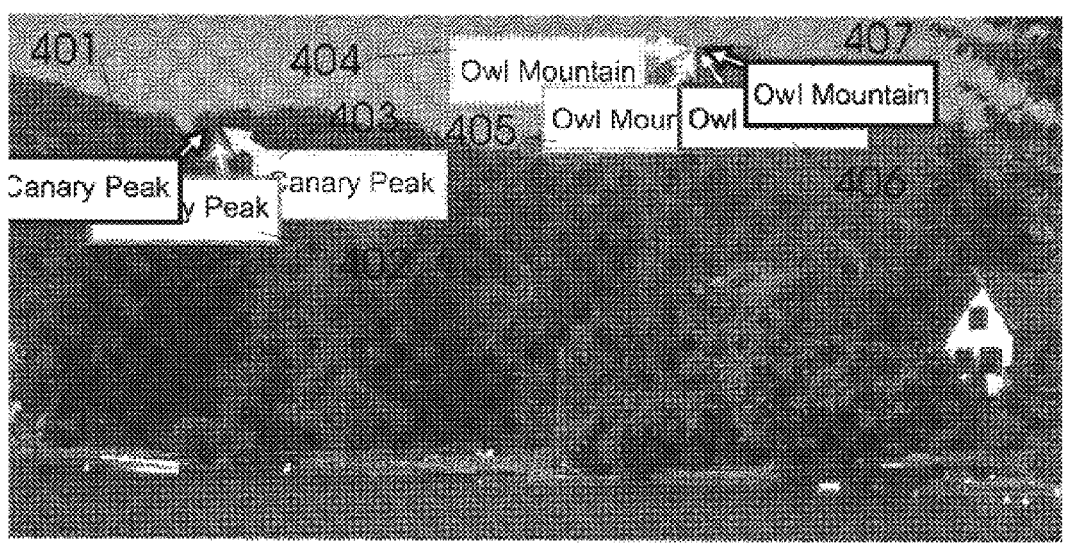

FIG. 40 shows a scheme where the position of a graphical user interface with respect to "known" objects affects the density of a type face used therein.

Figure 41:
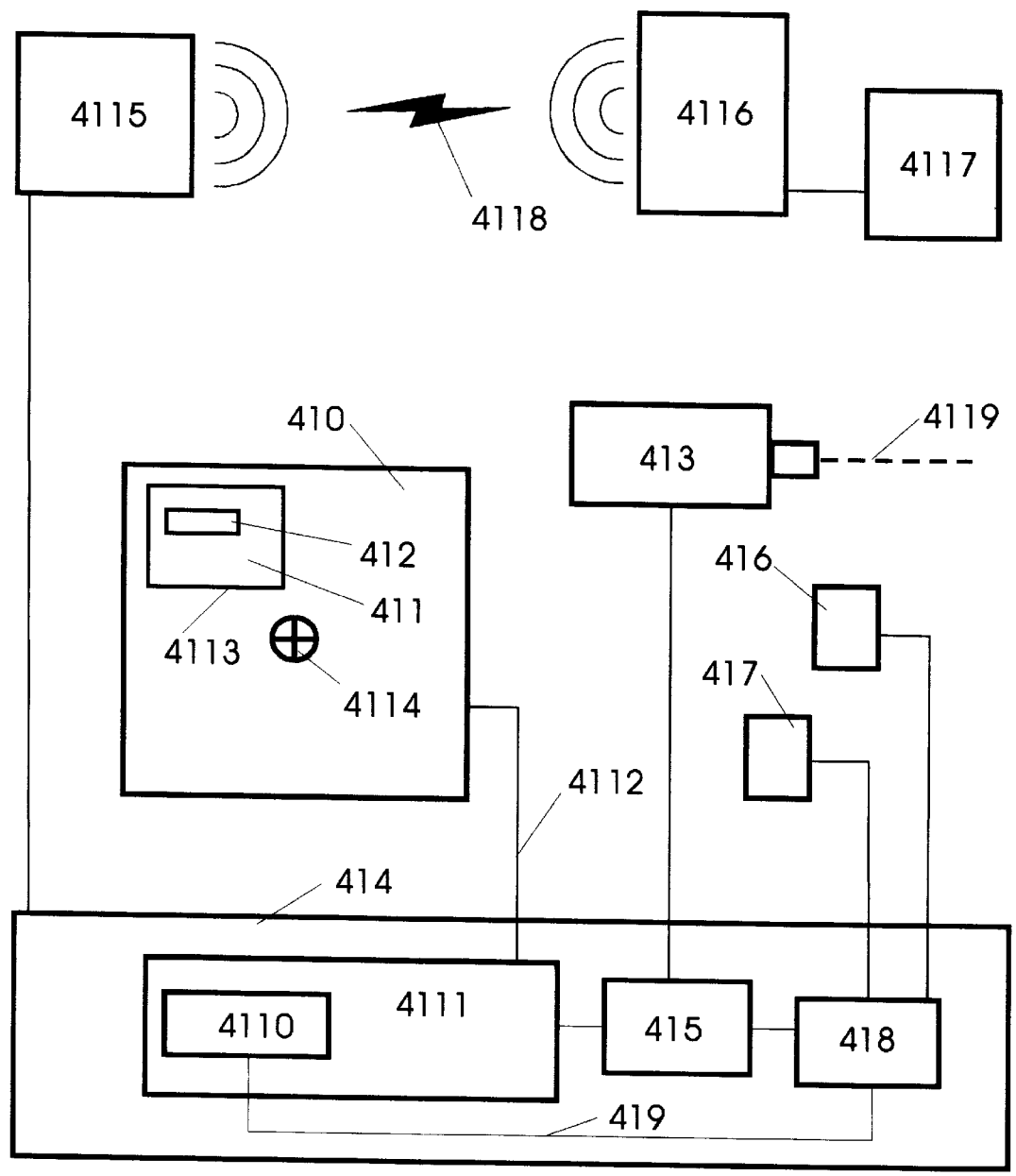

FIG. 41 is a block diagram of a device of the invention.

Figure 42:
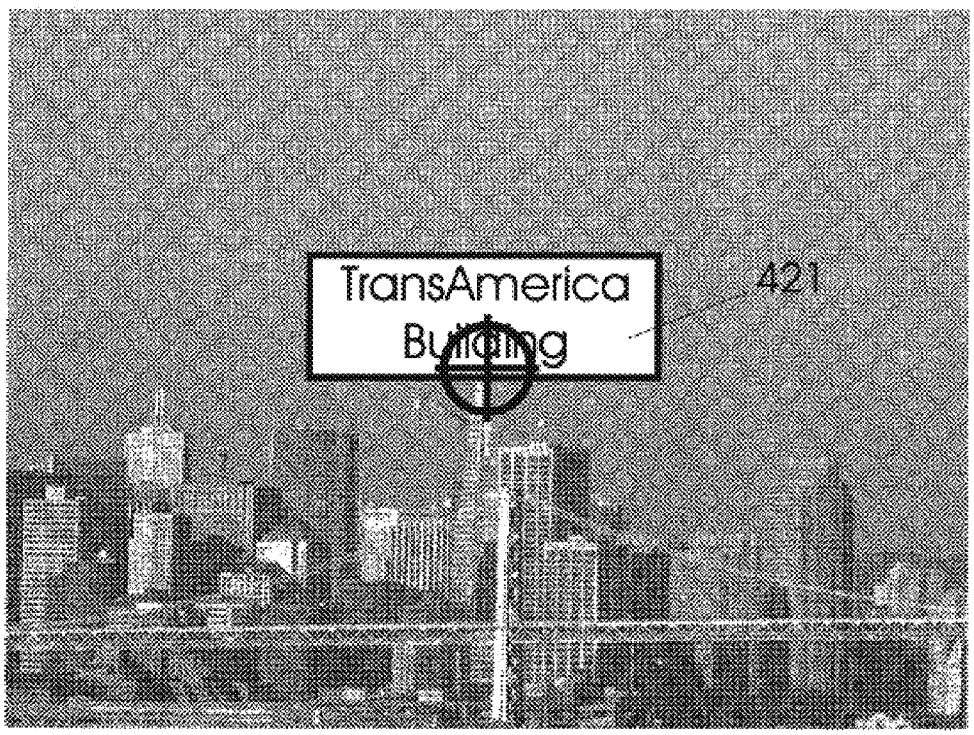
Figure 43:
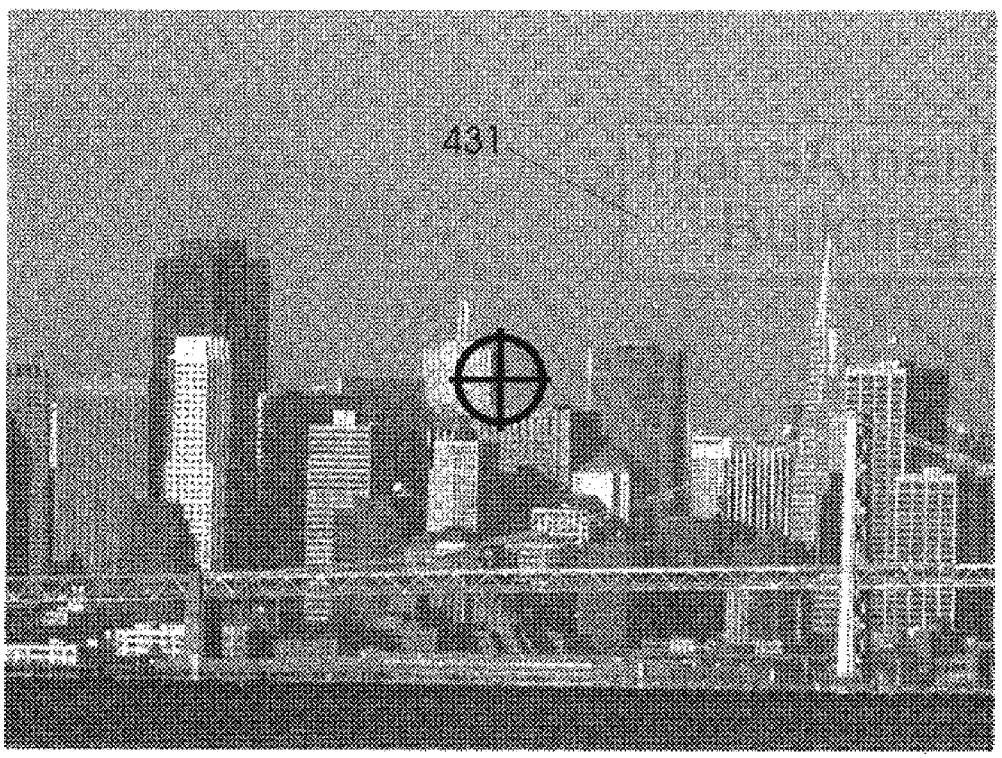
Figure 44:
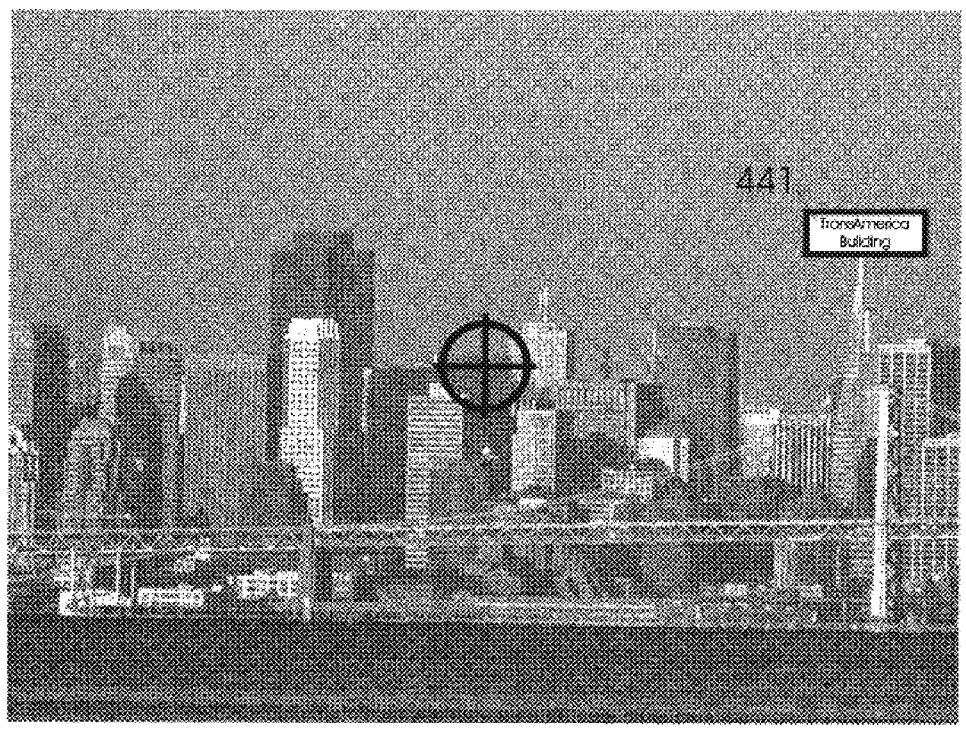

FIGS. 42–44 are images having a graphical user interface which responds proportionally in size or opacity to the offset between the pointing direction and the center of the graphical user interface.

Figure 45:
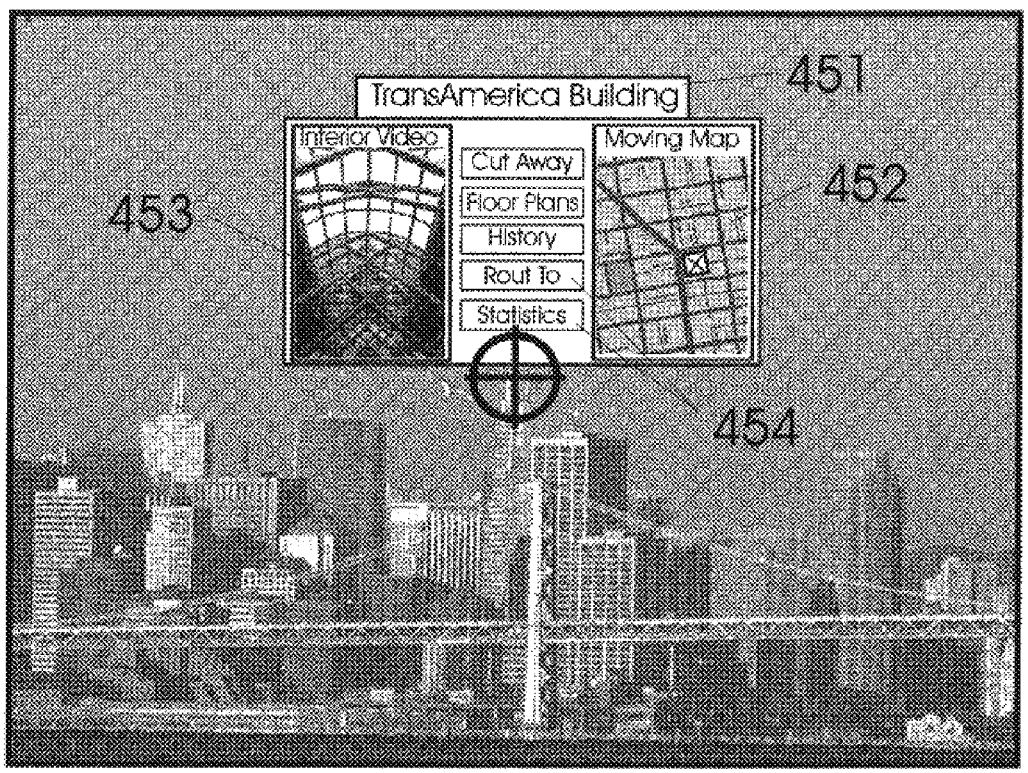
Figure 46:
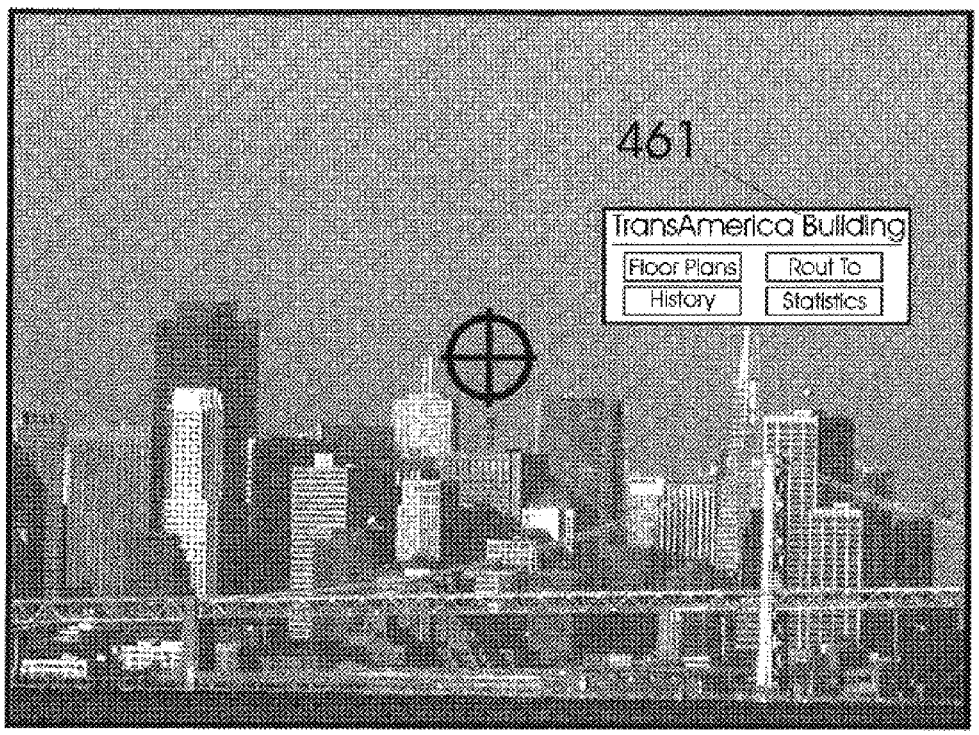
Figure 47:
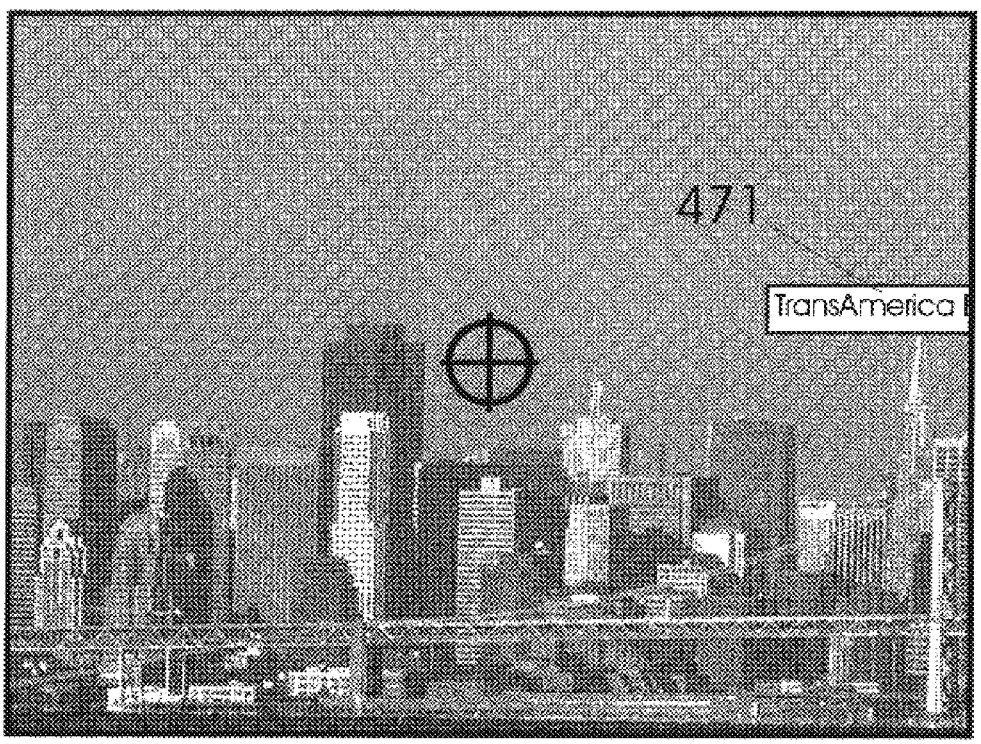

FIGS. 45–47 show graphical user interfaces which respond in complexity with respect to the pointing direction.

FIGS. 48–54 show a series of images which illustrate interaction between a graphical user interface enabled computer vision system and a transceiver station having a computer.

DEFINITIONS OF CERTAIN IMPORTANT TERMS

Certain terms and words used throughout this writing have special meaning associated with them. It is important for perfect understanding of the invention that the meaning of these terms be well appreciated. Accordingly, the following is presented to help further define the meaning of these terms. The descriptions should help clarify intended meaning but should not be used to attempt to limit the scope of any term. In other words, the definitions are formulated with an aim to give a general understanding but not intended to set forth or limit the scope of the terms. The true and full scope of each term may be determined by various means including: common uses in the arts, obvious alternatives to elements thereof, similar uses in parallel arts, among others. The list is in alphabetical order and no extra importance is intended to be given to terms listed first.

Augmented Image

An "augmented image" is a composite image comprising, at least, an optically acquired portion and a computer generated portion. The optically acquired portion is generally an image produced by an electronic camera. The computer generated portion is generally an image or image components produced in accordance with position and attitude determinations. An "augmented image" may additionally be comprised of graphical user interface devices.

Computer Generated Image

A "computer generated image" is an image or image components formed by a computer image processor. The processor may be in communication with a memory having stored images therein. Additionally it may be in communication with position and attitude determining means where the position and attitude of the computer vision system drives the processor to generate various images relating to scenes being addressed. A "computer generated image" may include graphical user interface devices.

Display Field

A "display field" refers to a place where an image is displayed in a computer vision system. The "display field" is substantially planar and is typically at four sides.

"Drag-and-Drop"

A "drag-and-drop" operation refers to a procedure where a switch is continuously engaged while a cursor is moved across a field.

Field Region

A "field region" is a two dimensional area with arbitrary boundary.

Graphical User Interface

A "graphical user interface" is a device. It generally exists as a field region in an image. It may serve to facilitate command of a computer or other user interface by way of graphical representation of information.

Normally Aligned

"Normally aligned" refers to a geometric construct which provides for orthoganality between objects which are "normally aligned".

Optic Axis

An "optic axis" is the symmetry axis or boresight of a lens which may define the pointing direction of a computer vision system having a camera.

Optically Acquired Image

An "optically acquired image" is an electronic image formed by a camera. Generally, a CCD type image detector forms an electronic image signal of a scene being addressed. It is possible that images be made from infra-red or alternative spectra. In addition, "optically acquired image" may include images from sonar, radar, ultra-sound among other common forms of imaging devices.

"Point-and-Click"

A "point-and-click" operation refers to a procedure where a cursor is made to be collocated with a field region while simultaneously engaging a switch.

Pointing Direction

Computer vision systems of the invention have associated with them a "pointing direction". Generally, a "pointing direction" is defined by and colinear with a camera lens axis of symmetry. Computer vision systems having a lens necessarily have an axis of symmetry. By aiming the camera lens in various directions, the "pointing direction" of the computer vision system is changed. To address a scene, one points the camera (lens axis) in the direction of the center of the scene. It is possible to have a computer vision system without a camera. In this case, the "pointing direction" must be defined with respect to some arbitrary reference direction.

Position and Attitude Determining Means

"position and attitude determining means" are facilities which measure or otherwise determine position and attitude of a computer vision system. Position may be determined with reference to a point on a line of the pointing direction and within the image plane of a computer vision system display. Attitude may be determined with reference to the pointing direction of the computer vision system.

'Real' Object

A "'real' object" refers to an object within a scene addressable by a computer vision system. Typically a "'real' object" is a car, or building, etc. A "'real' object" might be distinguished from an object which exists in an image in an abstract sense such as "menu" or other "image object".

'Real' Scene

A "'real' scene" refers to a scene which is comprised of real objects. It might be distinguished from a virtual scene which may be generated in an artist's rendering but not have any correspondence with objects which might exist anywhere in space.

Sub-Field Region

A "sub-field region" is a two dimensional area with arbitrary boundary within and enclosed by a field.

DETAILED DESCRIPTION OF PREFERRED EMBODIMENTS

It will become clear that major distinction between graphical user interfaces of the art and those taught here can be found in the fact that graphical user interfaces of the invention may interact with the pointing direction of the system on which they are deployed, they may interact with position of the system, they may interact with the perspective of an image being addressed, they may interact with objects being imaged including moving objects, they may interact with particular locations in the real world, they may interact with broadcasting systems external to the computer vision system, they may interact with abstract geometric constructs relating to scenes being addressed, et cetera. A simple graphical user interface may merely convey information to a user while more complex graphical user interfaces might provide an interaction mechanism by which a user might command a computer.

A SIMPLE COMPUTER VISION SYSTEM OF THE INVENTION

A computer vision system may be comprised of: a camera, a computer, position and attitude determining means, and a display. The camera may have a lens with an optic axis. The optic axis defines a pointing direction for the camera and consequently the computer vision system. The "attitude" of the computer vision system refers to the pointing direction of the camera. The display, typically a flat panel type emissive display device, has a substantially planar image field, or simply a "display field", generally bounded on four sides. The display field has associated therewith a "normal" direction which is perpendicular to the plane in which it resides. "Normal" is used here in the geometric sense as opposed to a common meaning: "usual". The display normal is generally aligned with the pointing direction of the system. For purposes of generality, use of the term "aligned" is clarified in detail as follows: When the display field is perpendicular to the optic axis it is said to be aligned therewith. At times, there may exist an angular offset between the display normal and the pointing direction of the camera. The display is still said to "be aligned" with the camera pointing direction so long as images displayed thereon are responsive to changes or displacements of the pointing direction. When the camera is pointed towards a scene, it is said that the scene is being addressed by the system. With this arrangement, an augmented image of a scene being addressed may be presented in the display field. Images captured optically may be combined with computer generated images to form a composite image. Computer generated images may be formed in proper perspective based on measurements of the system position and attitude. As it is sometimes desirable to command the computer while viewing an image of the scene, it serves objectives of the system to provide graphical user interfaces.

A SIMPLE GRAPHICAL USER INTERFACE OF THE INVENTION

Similar to graphical user interfaces which may appear on display screens of common personal computers, it is possible to superimpose graphical user interfaces onto the composite images of computer vision systems.

A graphical user interface of the invention includes a field region. The field region occupies a fractional portion of the display field. The field region is bounded by a periphery. Some boundaries of the field region may be coincident with boundaries of a display field. A graphical user interface may be arranged to contain information including graphics and images.

Accordingly, the invention provides:

a graphical user interface for a computer vision system, the computer vision system having a camera with an optical axis, a computer, a position and attitude determining means, and a display having a display field normally aligned to the optical axis, said graphical user interface being comprised of:

a field region; and a periphery, said field region being an area fractional portion of the display field enclosed by said periphery operable for displaying image and graphical information while a scene is being addressed by said computer vision system.

Peripheries

Some simple graphical user interfaces are bounded by four sides which form a periphery to the field region. Information inside the field region typically belongs to the graphical user interface and information outside is mostly independent of the graphical user interface operation and may belong to a more general computer application, usually the vision system. Information within the graphical user interface may include, text, video, control buttons, meters, indicia, "transparent" fields, graphics, maps, color, desktop objects, among others. For computer vision systems, information outside the graphical user interface includes augmented images of scenes being addressed.

Accordingly, the invention additionally provides:

A graphical user interface as described above where the periphery is quadrilateral in shape enclosing an area where information in the form of images and graphics is displayed, said images and graphics providing an interface to a computer vision system user.

Although most presentations herefollowing are directed to four-sided fields containing information therein, it is certainly possible to arrange a computer user interface with a complex periphery. For example, presenting a text string onto an image (see FIG. 19 of above cited reference Ser. No. 08/307,360). A graphic object like this implies a unique periphery for every different text string. One should not attempt to limit the graphical interfaces of the invention to window-type four sided objects. Since many uses of graphical user interfaces in the present invention relate to unique aspects of a computer imaging system, there is a tendency for the shape of the interfaces to communicate with image objects and features. Several of the following examples will demonstrate this concept in further detail.

Accordingly, the invention additionally provides:

A graphical user interface as described above where the periphery is of arbitrary shape and encloses an area where information is displayed, the information providing an interface to a computer vision system user.

The information displayed in a graphical user interface field region may be static or dynamic. In the case of information which changes, the change is triggered by some event or condition. We include as part of the computer a response mechanism which is operable for monitoring a condition or testing for the occurrence of an event and which further drives a means which supplies the particular information displayed in accordance with desired programming. While many hundreds of possibilities may exist, it is illustrative to mention a simple one here. A GUI with a field region having some information content can be made responsive to the camera attitude or pointing direction. When the camera points north, indicia which reflects that could be displayed. As the camera pointing direction is adjusted, the indicia may change in response thereto.

Accordingly, the invention includes:

A graphical user interface of claim 1, additionally comprising:
  a response mechanism, said response mechanism being in communication with said field region whereby said response mechanism operates to change information content thereof.

Sub-fields

In some versions, a graphical user interface of the invention may additionally include a sub-field region contained wholly within the field region. The sub-field region may display information independent of the information displayed in the field region portion that is exterior to the sub-field region. A sub-field region might be an icon device which activates a computer function when stimulated in conjunction with a "point-and-click" type operation. Generally, this involves two steps. A user causes a cursor to move onto the position of sub-field in a first step; the user triggers the command by closing a switch while the cursor remains collocated with the sub-field. Practitioners of the arts might associate this with a "mouse click". It is said that the sub-field is "responsive" to a cursor. Although it is in fact the computer which is responsive to the "point-and-click" operation, practitioners of the arts might simplify the matter by saying the sub-field is responsive. The condition where a cursor is collocated with a sub-field while a mouse click is engaged is tested in the computer logic processor. The sub-field is merely visual device which may appear to respond.

Accordingly, the invention additionally provides:

A graphical user interface described above, additionally comprising at least one sub-field region.; and, A graphical user interface described above, said sub-field being responsive to a cursor.

graphical user interface Reference Point and Pointing Indicia

Since graphical user interfaces of the invention are sometimes used to cooperate with images having highly significant spatial content, it is often advantageous to associate a graphical user interface with a point of reference in an image being displayed. However, a graphical user interface is necessarily a field region having extent in two dimensions which occupies an area having infinitely many points therein; any single point perhaps having no more significance than any other point. To advance the goal of associating a particular image point with a graphical user interface as a whole, graphical user interfaces may be arranged with a mechanism included to create an association. Indicia is added to the graphical user interface in a fashion which allows the graphical user interface to correspond to a single point. In a first example, a graphical user interface has a pointing arrow installed thereon. The tip of the arrow corresponds to the reference point. The tail of the arrow is attached to the periphery of the graphical user interface to associate the graphical user interface with the reference point. In this way, a graphical user interface comprised of a field region, a periphery and pointing indicia, may be associated with a single point in an augmented image.

Accordingly, the invention additionally provides:

A graphical user interface described above, additionally comprising pointing indicia having a reference point said indicia being connected to the periphery.

Relationship of Cursor and Pointing Direction

It is quite important at this point to note a very unique feature associated with computer vision systems. Images displayed in computer vision systems are unique to the pointing direction of the camera. This feature, in conjunction with pointing associated with graphical user interface operation provides fundamental basis for many graphical user interfaces taught here. Although "point-and-click" operations are common computer command operations, the "pointing" feature of a computer vision systems is unique. The camera boresight may be represented by indicia in the display field. This indicia is associated with a point defined by the intersection of a line in which the optic axis lies and a plane in which the display field lies. The boresight indicia can be used in a similar way that a common cursor might be used. The difference being that a profound relationship is established between the scene being addressed and the cursor. By manipulating the pointing direction of the camera and consequently the cursor (boresight indicator), graphical user interfaces can be related to real world objects and constructs. A very important example is contrived here to illustrate this point further. Since computer vision systems include an attitude determining means, the pointing direction of the camera is known to the computer at all times. A graphical user interface can be displayed by the computer to appear "fixed" to any point of the compass; for example a due West heading. By adjusting the camera to point West, a user causes the cursor to be collocated with the graphical user interface. The relationship between the pointing direction of the camera and the position where the graphical user interface is displayed in the display field provides great opportunity for advanced graphical user interfaces which are unique to computer vision systems. Cooperation between images displayed and the cursor position will be shown to yield great advantages to graphical user interface systems taught throughout this disclosure. A user can affect a "point-and-click" operation in a computer vision system. The pointing direction of the camera as represented by the boresight indicia may be used as a pointing cursor. When the boresight indicia is within the field region of the graphical user interface and a switch is activated, the computer can detect the condition and respond by launching a routine associated with the intended command. The reader will appreciate that although the pointing direction of the camera provides an excellent cursor, one that is used for most graphical user interface applications, it is not a requirement of the invention that the boresight cursor be used. Indeed, it is possible to provide graphical user interfaces for computer vision systems where a second cursor is driven by an alternative means such as a "trackball", "mouse", "eye tracker" or "powerpoint" device.

Accordingly, the invention additionally provides:

A graphical user interface described above, the optic axis of the camera corresponds to a point in the display field, preferably at its center, the computer being responsible to the condition when the point and sub-field are collocated simultaneous with activation of a switch.; and, A graphical user interface described above, wherein the cursor is the boresight of the camera.; and, A graphical user interface described above further comprised of:
a point in the display field defined by the intersection of the line in which the optic axis lies and the plane in which the display field lies;
a switch having a closed position and an open position;
a coincidence determining means in communication with said computer, for determining if said point is collocated with any point in the field region and further for determining the position of said switch,
whereby said computer is responsive to the condition of coincidence.

Example having Graphical user Interfaces Responsive to Attitude graphical user interfaces may be responsive to attitude of the system as determined by the attitude determining means. As a simple illustrative example, a graphical user interface held fixed in position with respect to the display field may merely display an indication of the direction on the compass in which the camera is pointing at any time. While pointing west, an indicator might show the text: "West". If the camera is adjusted 90 degrees right, then the indicator might show: "North". In this way, the graphical user interface is responsive to the pointing direction of the system without regard for a boresight cursor.

Accordingly, the invention additionally provides:

A graphical user interface described above, said sub-field being responsive to the attitude of the system.

graphical user interfaces may be Responsive to Position graphical user interfaces may additionally be responsive to position of the system as determined by the position determining means. As a simple illustrative example, a sub-field may merely display numerals corresponding to the latitude and longitude of the system. This is particularly useful for global applications. The reader will appreciate that on a smaller scale it would be possible to provide an alternative position unit. If one were in a warehouse, then a Cartesian coordinate system in feet or meters might be appropriate. A second simple example of a graphical user interface responsive to position was presented in the Summary where a graphical user interface having a shape corresponding to the border of a state is presented.

Accordingly, the invention additionally provides:

A graphical user interface described above, said sub-field being responsive to the position of the system.

The description to this point introduces simple concepts relating to graphical user interfaces as they might be arranged to cooperate with computer vision systems. Herefollowing are more examples and descriptions of advanced concepts relating to how graphical user interfaces might be arranged to advance further objectives of computer vision systems.

Graphical user Interfaces may be Responsive to Position and Attitude

Recall the graphical user interface having a reference point and pointing indicia associated with it. It may be activated such that text displayed therein responds to the position of the reference point with respect to the image being addressed and more particularly to specific objects in the scene. While this may not appear spectacular to a casual observer, a close look reveals its true capacity. If a computer vision system is addressing a scene and presenting an augmented image of the scene at the display, then a graphical user interface might be enabled to cooperate with objects in the scene. Objects in the scene can be "known" to the computer via stored information. Position and attitude determinations are used by the computer to determine exactly which objects are being addressed. For example, a computer vision system on Alcatraz Island in San Francisco which is pointing West "knows" the scene includes the Golden Gate Bridge. A recorded image of the bridge can be superpositioned onto the real image of the bridge. A graphical user interface placed with its reference point at the North Tower could display indication of that in the graphical user interface field region.

Therefore if the computer vision system addresses a scene containing a known landmark, and the graphical user interface reference point is positioned to correspond to the landmark in the image, then data relating to the landmark can be displayed in the graphical user interface sub-field. Merely causing the reference point of the graphical user interface to be coincident with a different landmark (moving the graphical user interface) would cause the sub-field to be updated with new information which relates to the new landmark.

Graphical user Interface may be Responsive to Image Signal

The computer can analyze the image signal provided by the camera in a pixel-by-pixel fashion.

Consider a graphical user interface having a text field and additionally having a reference point associated therewith. If the point corresponds to an image pixel which is red in color, then the text field may indicate the color of the image at that point. If the graphical user interface is moved to another location in the image, then the reference point would be associated with a new pixel, perhaps having a different color. The graphical user interface text field could display new text corresponding to the new color. This example is simple and tends to want utility; however, it illustrates a powerful point. The graphical user interface may interact with the image signal in real time.

Accordingly, the invention additionally provides:

A graphical user interface described above, said graphical user interface being responsive to an image signal generated by the camera.

It is certain that one will now gain strong appreciation for the true utility of such a novel arrangement. The clever combination of graphical user interfaces with computer vision systems, and particular features thereof including the attitude (pointing direction), position, position and attitude, among others; yields surprising results. In order to provide a thorough and complete disclosure, the following embodiments are presented with reference to drawing figures.

Figure 1:
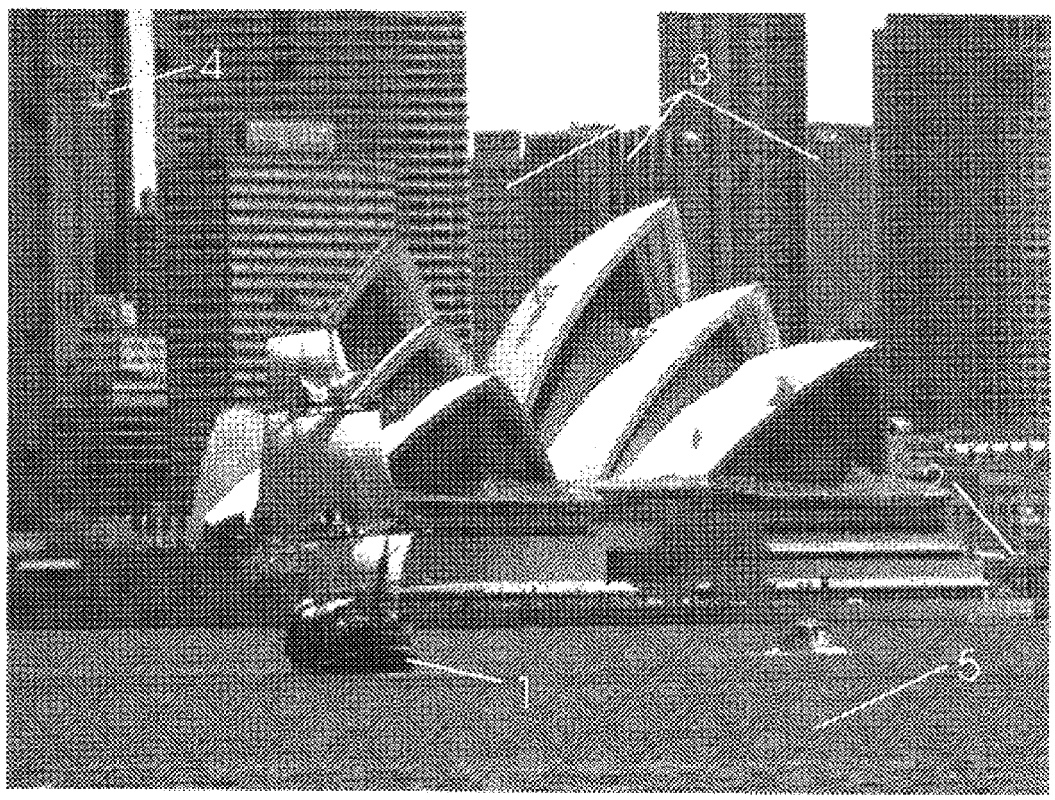
FIG. 1 is an illustration of a cityscape scene addressable by computer vision systems having various types of objects therein.
Figure 2:
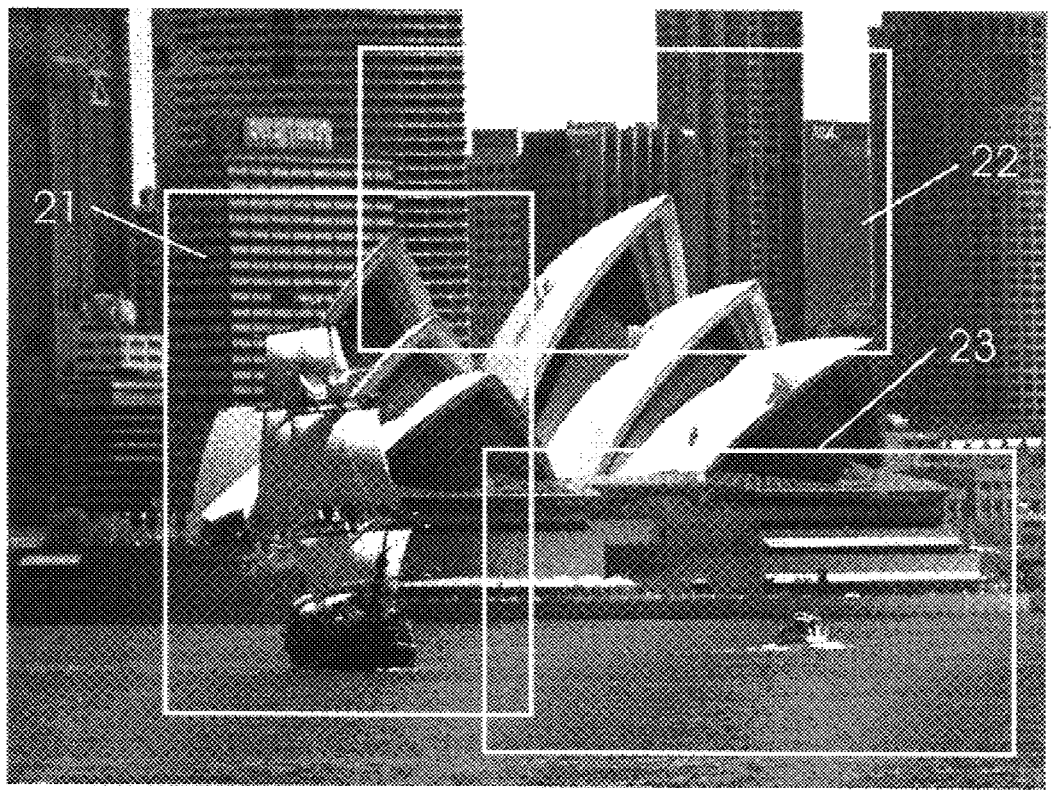
FIG. 2 shows three fields of interest within the scene of FIG. 1, each separately addressable by a computer vision system.
Figure 3:
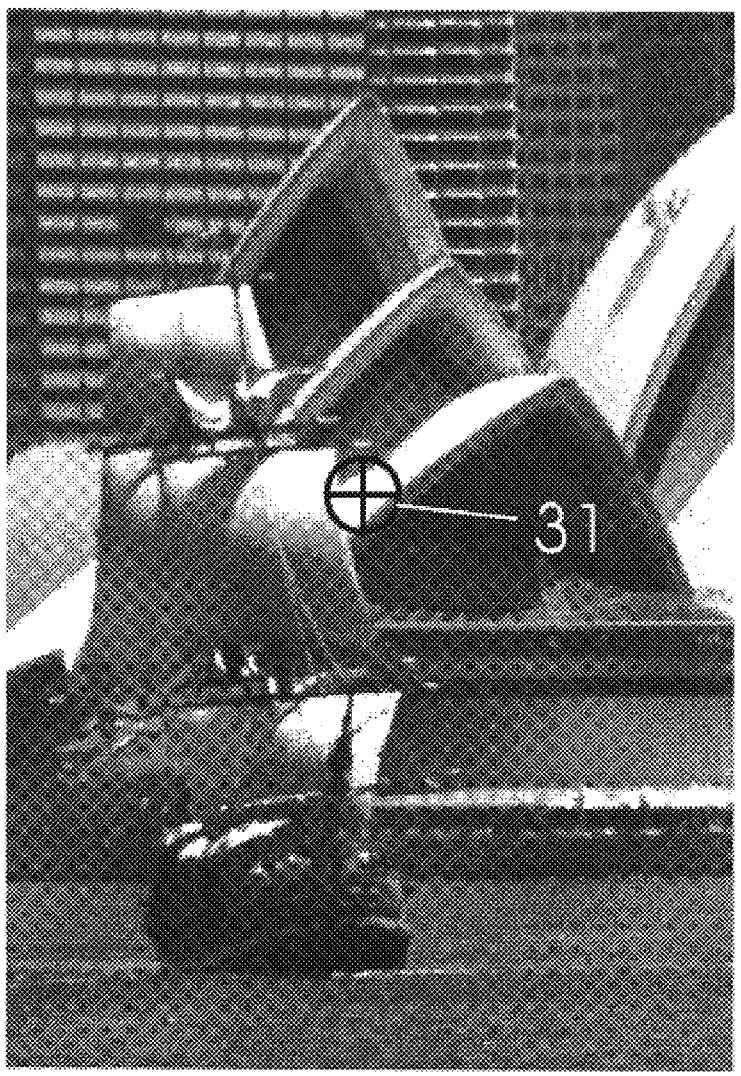
FIG. 3 is an image as it may appear to a computer vision system with boresight indicia therein.
Figure 4:
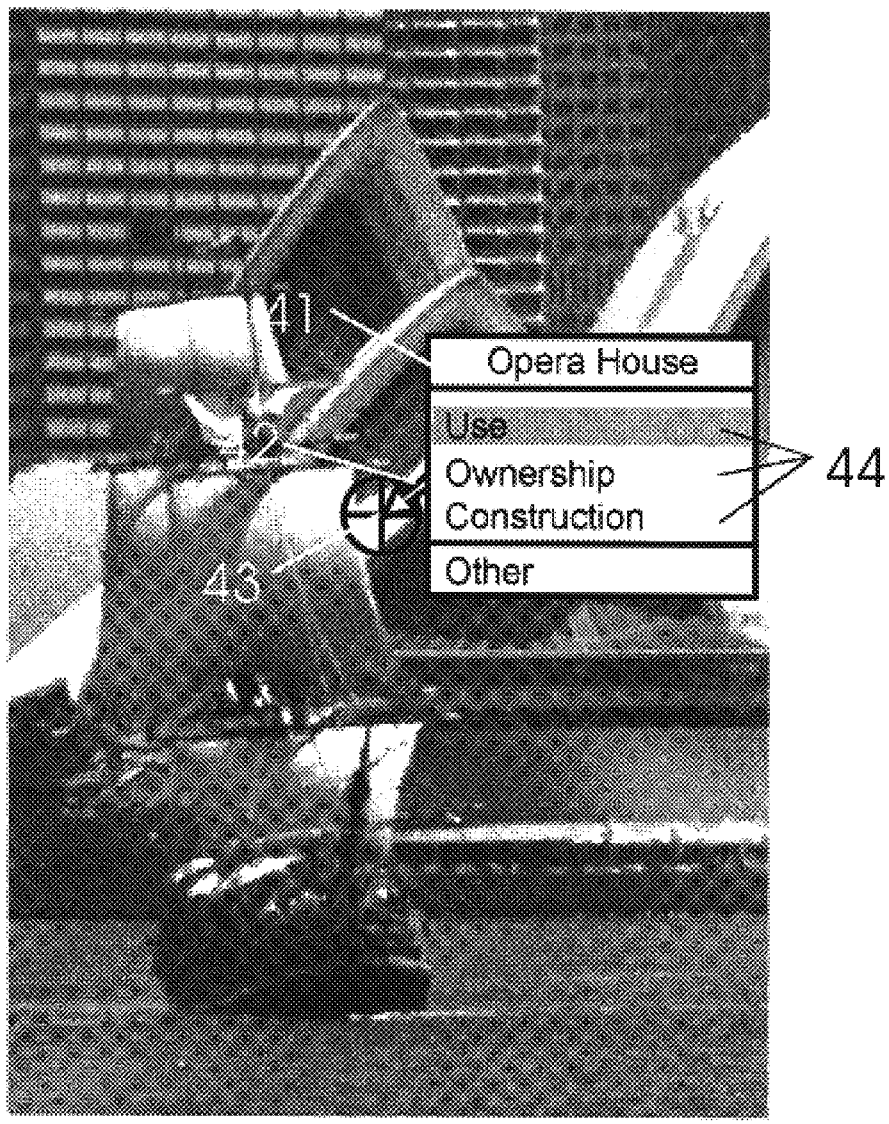
FIG. 4 shows a computer vision system composite image having a graphical user interface therein.

With reference to drawing FIG. 1, a cityscape scene is of interest to illustrate some graphical user interface devices. The scene includes particular types of entities or objects. These include: a) mobile or moving objects including: a boat 1, cars 2, and clouds or airplanes passing in the sky; b) fixed or stationary objects including: buildings 3, land, and a body of water 5; and c) a third type may include semi-stationary/mobile objects such as a crane 4 which tend to be stationary like a building but may sometimes move. A computer vision system may address various portions of the entire cityscape at different times. It will be useful for later presented examples to divide the cityscape of FIG. 1 into three individual scenes, 21, 22, and 23 of FIG. 2, each representing a single scene independently addressable by a computer vision system. FIG. 3 shows the scene 21 as a single image as it may be presented in a computer vision system. A graphic representation of the camera boresight is shown as 31 in the center of the image. If the computer vision system is panned to the right, the boresight mark remains in the center of the display; however, the images appear to move left in the normal manner which may be observed in common electronic cameras. If a graphical user interface is initiated in the presented image as shown in FIG. 4, it may include a field region 41, arrow indicia 42, a reference point 43, and sub-fields 44. The sub-fields 44 may contain data which relates particularly to the building associated with the graphical user interface by way of its relationship (superposition) to the reference point 43. Since the computer "knows" the position and attitude of the computer vision system, it is determined that the Opera House must appear at the boresight of the image. Accordingly, the computer presents in the graphical user interface sub-fields information which relates to the Opera House. This information may have been previously recorded in a computer memory.

Figure 5:
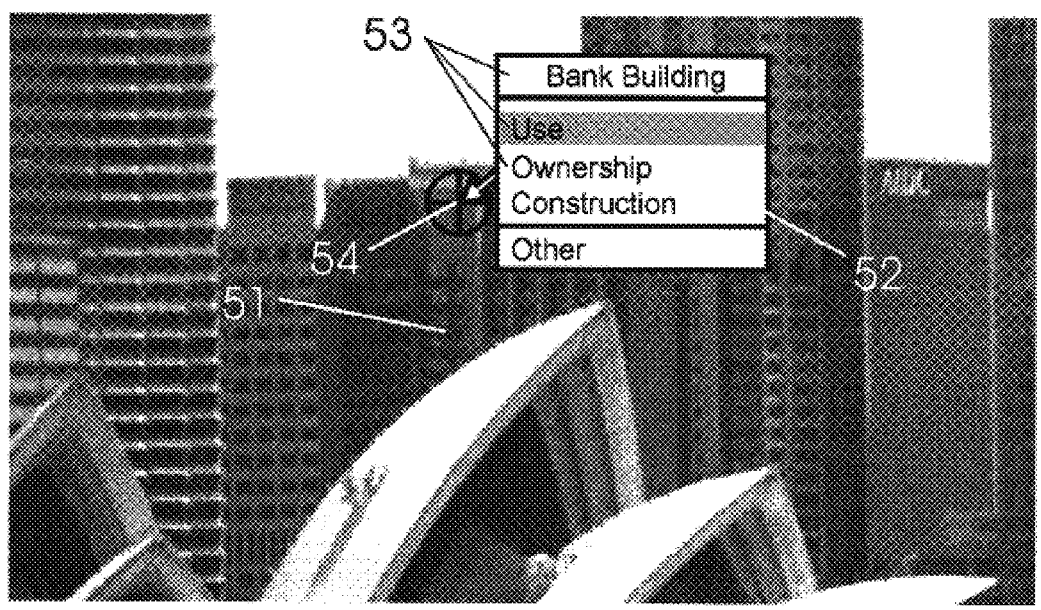
FIG. 5 show an image similar to figure four, but from a different portion of the cityscape scene.

Other objects in the cityscape may also be of interest. When the computer vision system is panned right to view other buildings in the skyline, new graphical user interfaces may be requested by the user. FIG. 5 shows another building 51 known to the computer via its location with respect to the computer vision system as determined in position and attitude measurements. The graphical user interface 52 has information in the sub-fields 53 which is different from that presented in 44. The new information is particular to the building associated with the new graphical user interface reference point 54.

Figure 6:
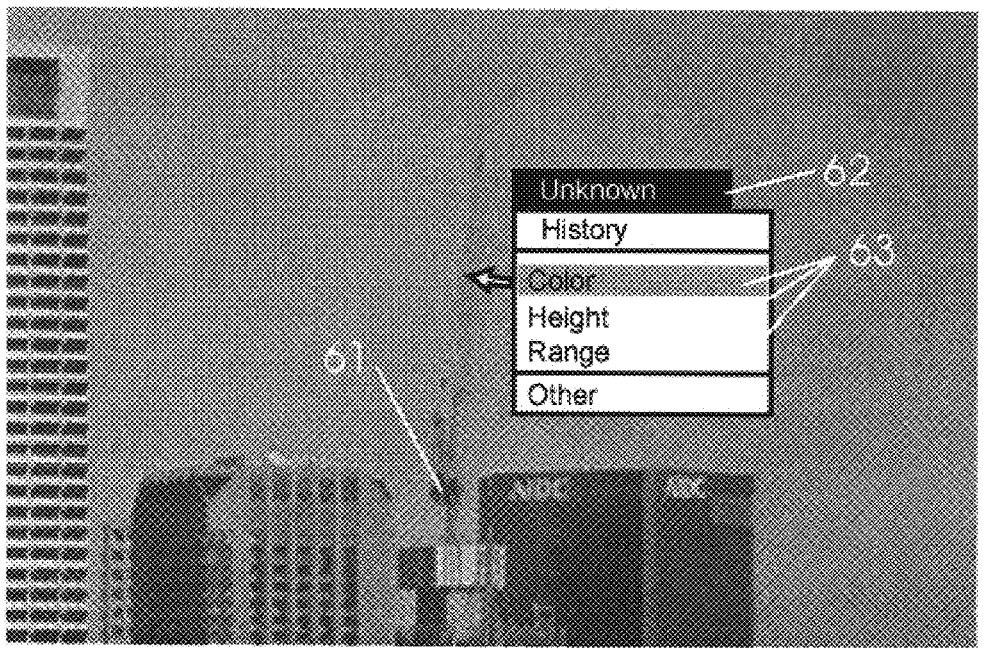
FIG. 6 illustrates a graphical user interface related to an object detected from analyzing an image signal.

Some temporary objects may be unknown to the computer due to its limited data base. For example, FIG. 6 shows a crane 61 in the skyline which may have been erected after the time when the computer was last programmed with data. In this case, the "unknown" object may be detected in the image signal but no information can be recalled. A sub-field 62 reflects this condition. A graphical user interface being initiated for this object would have limited data to present. It could present in sub-fields 63 information relating to the cranes height, color, range from the user, etc.

Figure 7:
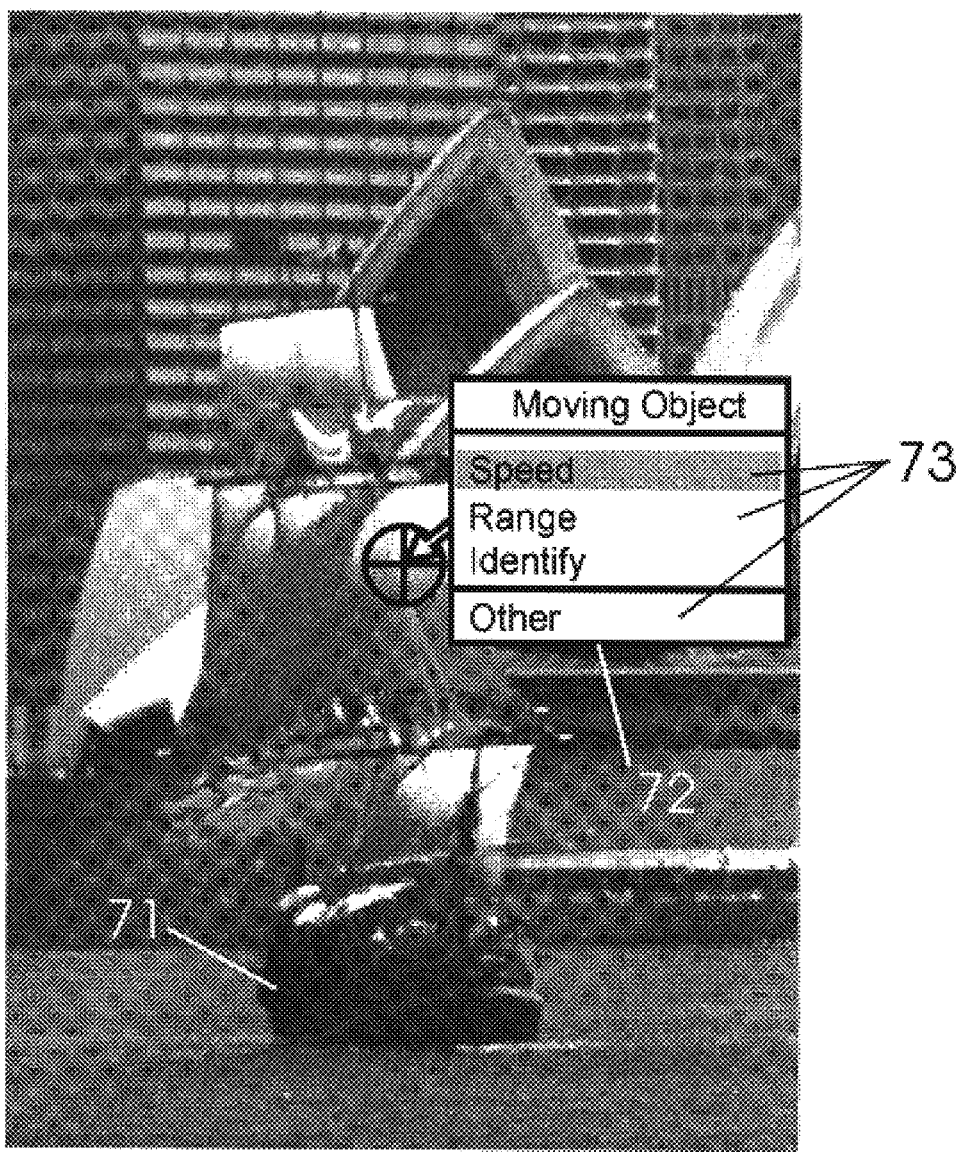
FIG. 7 is an image from a computer vision system which shows a moving object with a graphical user interface associated therewith.

Moving objects may be tracked by the computer. With knowledge of range and angular differencing, the computer may compute information about the moving objects. FIG. 7 shows a sailboat 71 where a graphical user interface 72 has been initiated and associated with the moving object. Again, it is unlikely that a computer database could know details related to the object. However, sub-fields 73 might display information relating to the object or properties of the object such as speed and color.

Figure 8:
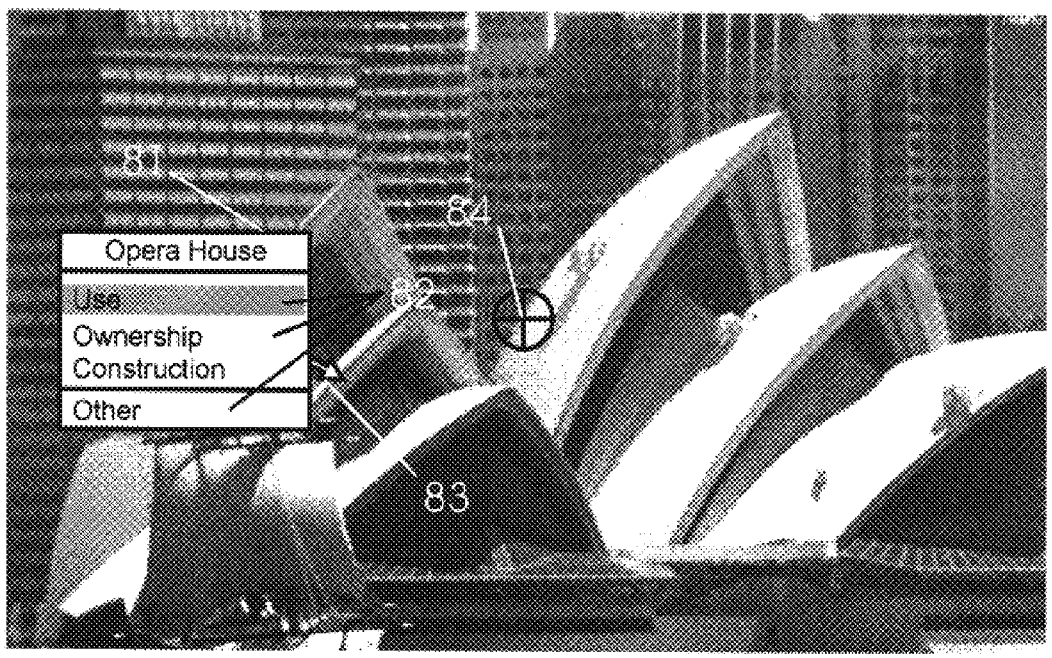
FIG. 8 illustrates a relationship between boresight indicia and a graphical user interface which has been locked to an image point.

The examples show how graphical user interfaces may be associated with a particular object of a scene via its co-location in the display field. In prior examples, a graphical user interface was initiated for objects at the point of the boresight. The graphical user interface reference point and the boresight were shown to be collocated. It is possible to "release" the graphical user interface from the boresight and leave it at an object such that it remains associated with that object. Upon a "release" command, the computer remembers where the graphical user interface is located and forces it to remain associated with that point in the image regardless if further adjustment to the camera pointing direction is made. The graphical user interface of FIG. 4 being initiated and then released, remains associated with the Opera House even if the camera is panned away so that the boresight no longer corresponds to the reference point of the graphical user interface. FIG. 8 shows an image of a scene having a graphical user interface 81 associated with the Opera House, with sub-fields 82 having data particular to the Opera House, and a reference point 83 located in a position of the image not associated with the boresight 84. There are several engineering solutions to maintaining the association of a graphical user interface with respect to a point in the real world. A first is to assign the graphical user interface reference point a unique position and attitude value upon a release command. A second may include a scheme to probe the image signal and apply pattern recognition techniques. Regardless of the particular mechanism which may be used, a graphical user interface held fixed in relation to an image in a computer vision system is believed to be quite new.

Figure 9:
FIG. 9 shows how two graphical user interfaces might look in a computer vision system image field where the interfaces appear to be beyond the edge of the screen.

Since graphical user interfaces may be "left" at some location in the cityscape, many of them may be initiated at various points therethroughout. They may even disappear from the field-of-view of the computer vision system at any given time, but still remain associated with the object to which they were assigned. When the computer vision system re-acquires the scene containing the object, then the graphical user interface reappears. FIG. 9 shows portions of two graphical user interfaces, 91 and 92, placed on objects and "locked" thereto. In this example the display field boundaries are considered to partly make up the graphical user interface periphery. Note that a portion of the graphical user interface seems to extend beyond those limits.

Figure 10:
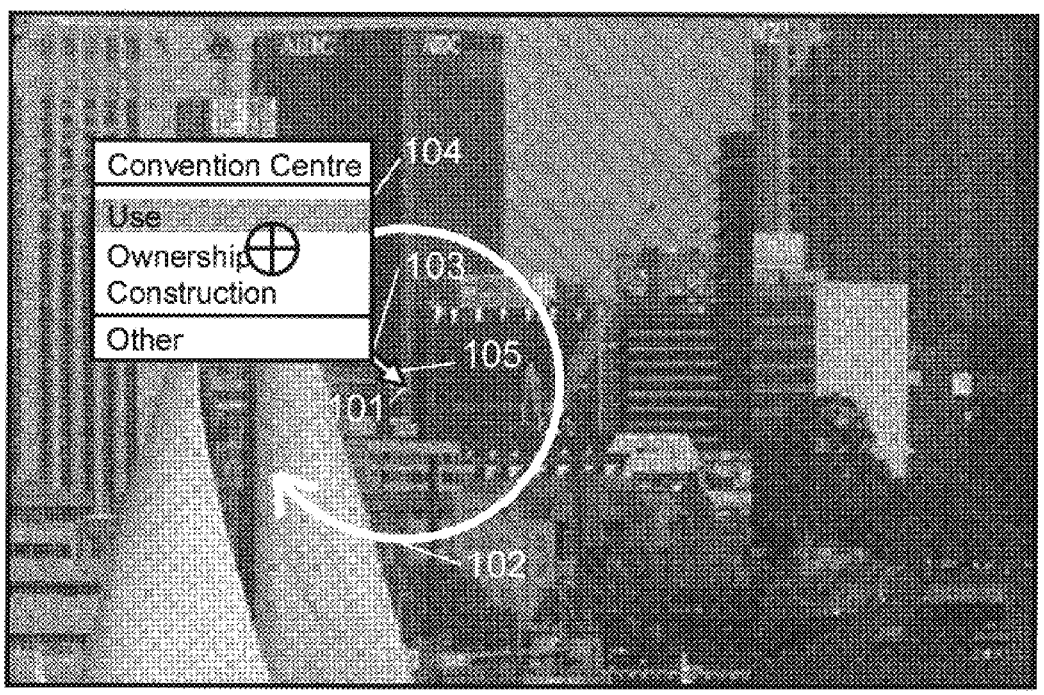
FIGS. 10–12 illustrates a graphical user interface and scheme of positioning it within an image field.
Figure 11:
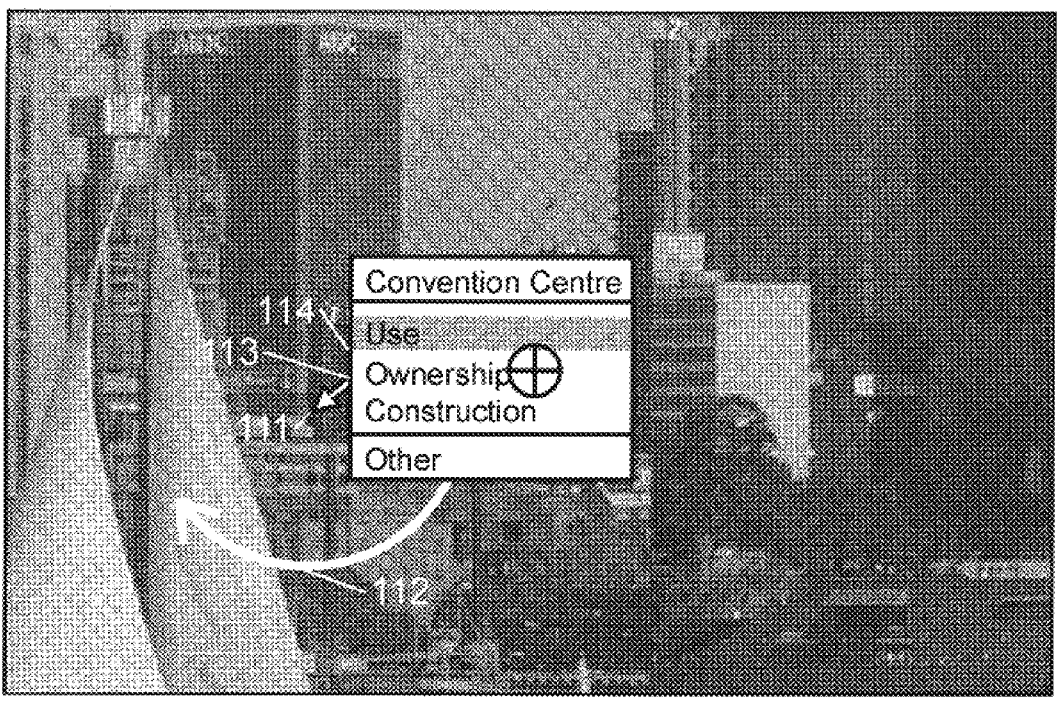
Figure 12:
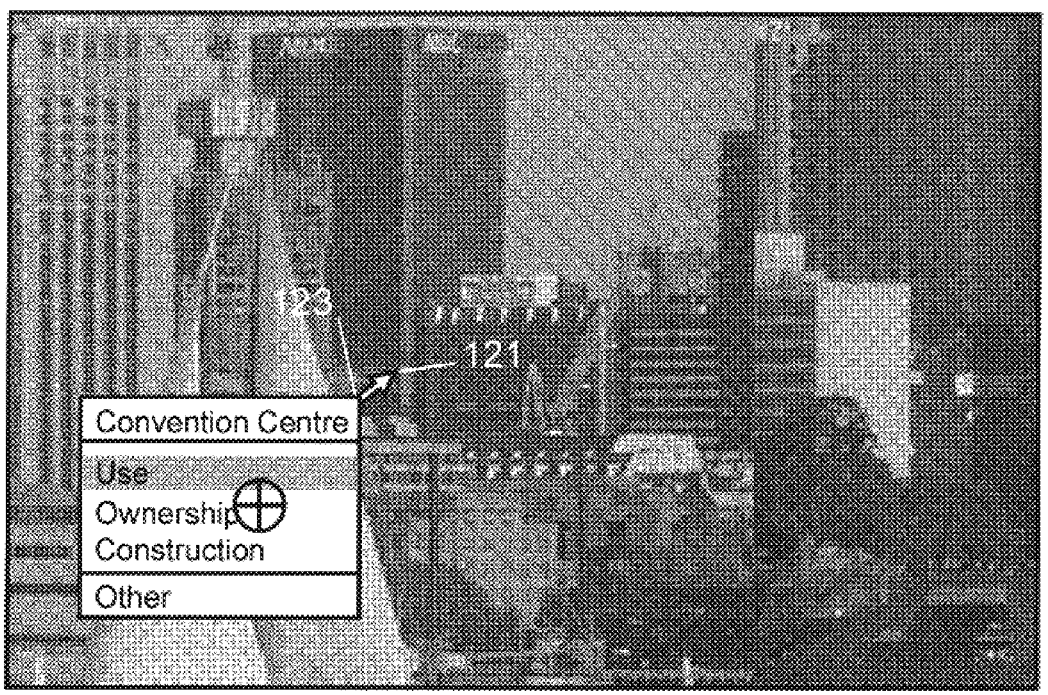

One might note a slight difference between graphical user interface 91 and graphical user interface 92. The arrow indicia is located in the opposite lower corners. It is useful to allow the position of the point of reference to be selectable by the user. Since an image may contain a certain portion which preferably should not be blocked by a graphical user interface, graphical user interfaces are allowed to have an adjustable reference point and pointing indicia. After a graphical user interface has been initiated and released from the boresight, it may be manipulated further. Activation of a particular computer routine may cause the graphical user interface to be translated along an arc centered at its reference point. For example, the boresight can be used to "grab" the graphical user interface at any point in its field region. Further adjustment of the camera pointing direction then causes the graphical user interface to move along the arc centered at the reference point. FIGS. 10–12 show how this might look. A reference point 101 has an arc 102 associated with it. Arrow indicia 105 "attached" at the graphical user interface periphery would be slidably movable along the entire periphery 104 while its tip remains fixed at a point in the image. FIG. 11 shows that advance of the pointing direction about the arc 112 would cause the graphical user interface to be moved to a new position in the image while keeping its reference point 111 stationary with respect to an object in the image. During this process, the arrow tail 113 remains attached to the graphical user interface at its periphery 114 where it appears to slide therealong. Finally, FIG. 12 shows the completed operation with the graphical user interface in a new location, the arrow tail 123 attached to the periphery in a new position, and the reference point 121 remaining at the same place with respect to the Opera House. While this rotation about a fixed point is useful, it is noted that there are other possible schemes of moving a graphical user interface about an image while maintaining a relationship with an object in a scene being addressed. One might note that the Opera House actually occupies an area of image. Indeed, there is nothing significant about the exact point chosen for the examples in FIGS. 10–12. FIG. 13 shows an outline 131 which contains the image area occupied by the building of interest. Using a "drag-and-drop" operation, one may move the graphical user interface to a new location in the image shown in FIG. 14 while maintaining the relationship of the graphical user interface and the Opera House. So long as the graphical user interface reference point is associated with any point on the building, then information displayed therein could be arranged to correspond with that building. It is duly noted here that dragging and dropping a graphical user interface is a common operation in some computer programs, however when the camera boresight is used as a cursor, the resulting images behave in a greatly different fashion providing a very useful and unique effect.

A graphical user interface may be moved automatically without manipulation by the user. A first example relates to a moving object which can be tracked by probing the camera image signal and detecting motion. If a graphical user interface is "fixed" to a moving object, then the graphical user interface would move while the object moves. This was first shown in FIG. 7. A second example is illustrated in FIG. 15. The image includes a scene of a river 151 and mountain range 152. A trail is featured in the augmented image as a highlighted path 153. A graphical user interface 154 could be made to follow the path while remaining at a predetermined apparent size. As the user advances along the path, the graphical user interface always appears to subtend the same solid angle; the graphical user interface appears to follow the path ahead of the user.

The previous examples show quite vividly how graphical user interfaces of the invention might interact with objects being imaged by a computer vision system. The following presents a detailed look into relationships graphical user interfaces might have with a computer vision system user's environment in general. For the following discussion, it will be advantageous for the reader to recall concepts of geometry as they may relate to a user's point-of-view. For example, the directions of the compass North, South, East and West. Compared to the prior section, compass direction is totally independent of scenes being addressed and any subject matter therein. Additionally, the notions of "a plane parallel" or "a plane askew" with respect to the camera pointing direction is unaffected by any subject or scene being addressed. With that background note nicely set, the following will then receive due attention.

With reference to FIG. 16 where a compass 161 is illustrated along with a computer vision system 162 having a pointing direction 163 and field-of-view 164. Within the field-of-view a graphical user interface field region 165 may appear. The computer may be programmed to keep the graphical user interface on a westerly heading regardless of the pointing direction of the camera. For example, if the camera is panned slightly right (North), then the graphical user interface appears to move to the left side of the field-of-view. FIG. 17 is a drawing similar to the one of FIG. 16 where the pointing direction of the computer vision system has been slightly adjusted. The camera pointing direction 174 no longer points West. As the field-of-view 172 moves right (it necessarily moves with the pointing direction), the graphical user interface 173 appears to move to the left of the field-of-view as it remains on a due westerly heading as maintained by the computer. In the event that the computer vision system is pointed North, then field-of-view would no longer contain the graphical user interface. The graphical user interface would "disappear" and not be displayed in the display field. FIG. 18 shows a field-of-view 181 which corresponds to a camera 182 pointing 183 North. The graphical user interface 184 remains off in the westerly direction 185 in relation to the user. Even though the graphical user interface is not displayed, the computer remembers where the graphical user interface is. Should the user return the pointing direction to the West, the graphical user interface would be re-acquired. It is now clear that graphical user interfaces of computer vision systems might be arranged to cooperate with geometric or topologic features of a user's environment. Of course, since simple personal computers typically do not have dynamically movable display screens or "pointing directions", this cooperation between graphical user interfaces and the pointing direction has heretofore been completely unknown.

More complex relationships also exist. For example, a combination of the direction to a stationary object and the instant pointing direction may provide basis for locating a graphical user interface with respect to a field-of-view. FIG. 19 shows a camera 191 of a computer vision system where the camera has associated therewith an attitude indicated by direction 192. A known object, or in the present case a building 193, has a direction 194 defied by a vector between the camera and the building. A graphical user interface 195 may be made to appear in the direction 196 which bisects the angle Phi 197 between those directions. If the camera pointing direction changes by an amount DeltaPhi, then the graphical user interface changes by an amount equal to half DeltaPhi. The graphical user interface would appear to "float" as the pointing direction is varied.

It is an expert reader who will recognize a curious phenomena at this point. The graphical user interface 195 tends to appear without perspective. At all times, it is normally aligned with respect to the direction 196. However, this is not a requirement. FIG. 20 shows a construction having a building 201, a camera 202, a camera pointing direction 203, and a proposed rotation of the camera away from the horizon in an upwardly direction 204. A graphical user interface may be defined to appear at all times perpendicular to the horizon while simultaneously being at the boresight of the camera such that the graphical user interface always appears to be in the plane 206 shown. By pointing the camera straight up, or 90 degrees from the horizon, a user would cause the graphical user interface to move off to an infinitely far away position as it would be viewed from the user's location. This shows one of the many possible arrangements where graphical user interfaces are arranged to interact with geometric constructs or topological features of the user's surroundings. In most applications, it is anticipated that a graphical user interface will appear normal to the camera pointing direction. This is illustrated in FIGS. 21 and 22 which show a single object being addressed from two directions orthogonal to each other. The same graphical user interface is presented in each image where its orientation with respect to the object appears to be rotated. The graphical user interface is made to appear perpendicular to the camera pointing direction from both points-of-view.

It is now easily appreciated that graphical user interfaces may be arranged to cooperate with the pointing direction of a camera in a fashion which has heretofore been completely unknown. The sections above illustrate some spectacular effects which can be achieved with graphical user interfaces of the invention. Still further relationships between graphical user interfaces and images produced by computer vision systems exist. These are not necessarily based upon the position of an object as was demonstrated in the first section presented, nor the topologic and geometric configurations of the user's environment as shown in the second section, but they are related more closely to the perspective of images being addressed. The following sections introduce additional novel relationships between graphical user interfaces and computer vision systems.

Most common uses of graphical user interfaces relate to menu selections. There is generally no value nor function associated with the shape of the device. Consequently, common graphical user interfaces are typically rectangular in shape. Since graphical user interfaces of the invention can sometimes be related to a real object in a scene being addressed, and since objects in a scene are generally three dimensional, graphical user interfaces might preferably have attributes of 3-D objects; specifically, perspective. When a computer vision system forms an image of a real object, it appears as a two dimensional shape having a certain perspective. FIG. 23 shows a publicity billboard for a boat cruise service company. The actual sign 231 is rectangular in shape. However, since the image was captured from a certain point-of-view, below and left of the sign, the sign appears in perspective. In the image plane the boundary of the sign forms a quadrilateral shape. Similarly, the text 232 appears in a perspective unique to the point-of-view. For every location from which an image of the billboard may be made, there exists a unique perspective and hence shape in which the sign will appear in a 2-D image.

Where graphical user interfaces are made to cooperate with such objects, it may be advantageous for them to appear in a corresponding perspective. For example, if the function of a certain graphical user interface is to translate the written language of the sign into a language understood by the computer vision system user, then it would be useful to have the graphical user interface to appear in an identical perspective with new words. FIG. 24 shows a graphical user interface 241 having a periphery which is quadrilateral in shape and which exactly matches the shape of the real billboard as it appears from the point-of-view of the computer vision system. Similarly the translation text 242 and 243 has been presented in proper perspective. Billboards have the simple function of relaying information to a reader graphical user interfaces of the invention may and additionally provide for user interaction. In the presented example, certain sub-fields 244 have been included to illustrate facilities for user interaction with a graphical user interface configured as a virtual billboard. In this way, a user might now interact with the sign by "clicking" on a sub-field of interest. The sub-field 251 in FIG. 25 having the German word "KURS" therein can be activated to reveal a new graphical user interface 252. Since the image displayed in graphical user interface 252 is a map which does not correspond to any object in the scene., it may be best presented without perspective. The course 253 can be shown in the map which indicates where the boat cruise will go. A sub-field 262 of FIG. 26 relates to a second function. By "clicking" on that sub-field, a user can learn about the cost of the trip including a mechanism to convert between German and American currencies. Since the graphical user interface 261 does not directly relate to any object in the scene, it is presented in a simple rectangular shape. When a computer vision system is moved to a new location, objects of the scene appear to take a new shapes (perspective is different for every point-of-view). A graphical user interface which takes the shape of an object in perspective, can similarly change its shape for every point-of-view. This is possible because the computer is constantly updated with position and attitude information which can be used to compute the perspective of any object "known" to the computer.

The invention provides:

A graphical user interface as described above, where the periphery corresponds in shape to a three dimensional object in the scene as it appears in perspective from the point-of-view of the computer vision system.

Although a billboard illustrates an object in perspective quite well, it does not account for the effects which may be observed when considering objects having appreciable depth. For example, a billboard having a cubic shape having six sides. When one addresses such billboard from various perspectives each of the sides may come into view. In this way, we may provide graphical user interface which appears as e-D objects having depth.

Similar to simple graphical user interfaces of the invention, graphical user interfaces which appear in proper perspective may incorporate sub-fields for various purposes. The sub-fields may have simple rectangular shape or may be of complex shape and may correspond to the perspective of some object. They can be arranged to operate as "push buttons" where they are responsive to a cursor and "point-and-click" operations.

Therefore the invention also provides:

A graphical user interface as described above, where the field region contains a plurality of sub-fields, each contained entirely within the periphery of said graphical user interface, and additionally:

A graphical user interface as described above, where the plurality of sub-fields comprises at least one sub-field which corresponds in shape to a three dimensional object in the scene being addressed as it appears in perspective from the point-of-view of the computer vision system.

graphical user interfaces may contain information which is not as useful when presented in perspective. However the information may still relate to physical aspects of the scene being addressed. This is the case for graphical user interfaces which may contain a map. Since map information displayed in the graphical user interface is of a nature where it is best understood without any distortion due to perspective. A map is best presented without perspective, as perspective causes a varying scale over the area of the map. But a map might be more useful if one is able to see how it relates to a scene in the perspective from where the user might view the scene. For clarity, it is possible to generate a graphical user interface in a rectangular shape and combine it with certain indicia to provide a conformal mapping scheme which indicates where the map boundaries would appear in the scene. Accordingly, a graphical user interface can be arranged to display a map in a rectangular shaped graphical user interface as in FIG. 27. That map graphical user interface 273 can be then be combined with indicia in the form of a lines 271 which represents the four sides of the map. Conformal translation results in indicia having a shape which contains six sides including two sides of the display field. Parts of the indicia may be "hidden" behind the graphical user interface itself depending upon where the graphical user interface is positioned in the display field. Graphical user Interfaces of the Invention therefore include:

Graphical user interfaces as described above, additionally comprising indicia in the shape of a polygon having at least three sides, each side of the polygon corresponding a side of the periphery of the field region or the boundary of the display field, the periphery of the field region corresponding to some physical feature of the scene being addressed as it appears from the point-of-view of the computer vision system.

It is useful to show a translation guide between the rectangular periphery of the graphical user interface and the indicia lines which represents the rectangle in perspective. By presenting indicia 272 which connect the corners of the rectangle with the appropriate points in the scene it is visually easy to make the translation between the map and the real world.

Therefore:

A graphical user interface as described above, additionally comprising indicia in the form of translation lines which provide visual translation by connection between corresponding points on the periphery of the graphical user interface and points on the indicia polygon which are related to each other, is provided.

Map graphical user interfaces described have an area that is to be translated into proper perspective with respect to the image of the scene. It is not always an area that is desirable to be translated, but sometimes a line, path or route. FIG. 28 shows a map with a route 281 in one perspective (i.e. generally from above), but the same route appears in the scene in a different perspective. Indicia 282 in combination with the route of a graphical user interface presents a means to understand how a route may appear to a user from any point-of-view.

The invention includes:

a graphical user interface described above, additionally comprising indicia forming at least two paths, each path being comprised of a series of points, a first path being within the field region; and a second path being within the display field, the second path corresponding to the first path, the second path being shown in a perspective which has been translated from the perspective of the first path to a perspective which corresponds to that of the scene being addressed.

The example of FIG. 27 presents a case where an image is modified to show the map boundaries. Similarly, it is possible to modify the map to show the computer vision system's boundaries. The field-of-view for a camera is a cone. In two dimensions, it takes the shape of a triangle. FIG. 29 shows indicia 291 displayed on the map of the graphical user interface to indicate the extent of the field-of-view of the camera. Of course, if the lens is caused to perform a zoom function, then the apex angle of the graphic would be responsive to that change. Since a cone which represents field-of-view extends infinitely far, the graphic must be limited at the map boundary. Indicia which represents the field-of-view in a map graphical user interface is typically a four-sided or three-sided polygon.

Accordingly, a graphical user interface as described above, additionally comprising a sub-field region having at least three sides, two of which correspond to the boundary of the field-of-view of the camera, is provided.

graphical user interfaces are not only dynamic in shape as presented, but they may be dynamic in size as well. So long as the graphical user interface field region is a subset of the display field, then it may be of any size without practical restriction. FIG. 30 shows a small graphical user interface 301 containing the text letter "t"; and an expanded graphical user interface 302 having the same letter 303. The large graphical user interface occupies a larger portion of the display field and blocks more of the image of the scene. Certain applications may find use in allowing a single graphical user interface to switch from a small size to a large size and back again. Maximum detail in a scene can be realized when the graphical user interface is small. If interaction with the graphical user interface is desired, then it can be "called". When it is called, it can be expanded to facilitate interaction therewith. After use, it can be "sent back" to its small non-interfering size. "Call" and "send back" zoom type functions can be installed in the computer image generator routines.

An additional type of graphical user interface involves another magnification feature. A graphical user interface is arranged to provide a magnified image of a selected portion of the scene being addressed. A user may interact with the image by way of a "click and drag" operation to define a region to be magnified. This is illustrated in FIG. 31 where a scene of a cityscape 311 is being addressed. A cursor is positioned at a start point 312. While holding a button, the cursor is dragged in the direction of the arrow to a stop point 313 where the button is "released". The area selected indicates the image region to be magnified. In response to the definition of the area, the computer provides a new field showing a magnified image therein. FIG. 32 shows the harbor of a large city. An area 321 of the display field is defined by "click and drag" for a magnification operation. A second field 322 is provided with a magnified image of the area therein.

Many examples of graphical user interfaces having interaction with the pointing direction have been presented. There is another structural element of the computer vision system which can be arranged to interact with a certain kind of graphical user interface. The display field boundaries might be activated to act upon a graphical user interface such that it influences its position within the field-of-view. This specialized type of graphical user interface includes one having an association with a particular point in the image until displacement of the pointing direction causes a portion of the graphical user interface periphery to be collocated with the boundary of the display field. When a portion of the periphery is collocated with the edge of the display field, the graphical user interface would be released from its fixed position and advanced across the scene until further displacement of the pointing direction stops. At that time, the graphical user interface is "dropped" or associated with a new point in the image and remains fixed thereto until the display field and graphical user interface edges are again collocated. In this way, a graphical user interface is made to remain continuously within the display field regardless of the extent of change in the pointing direction.

Figure 33:
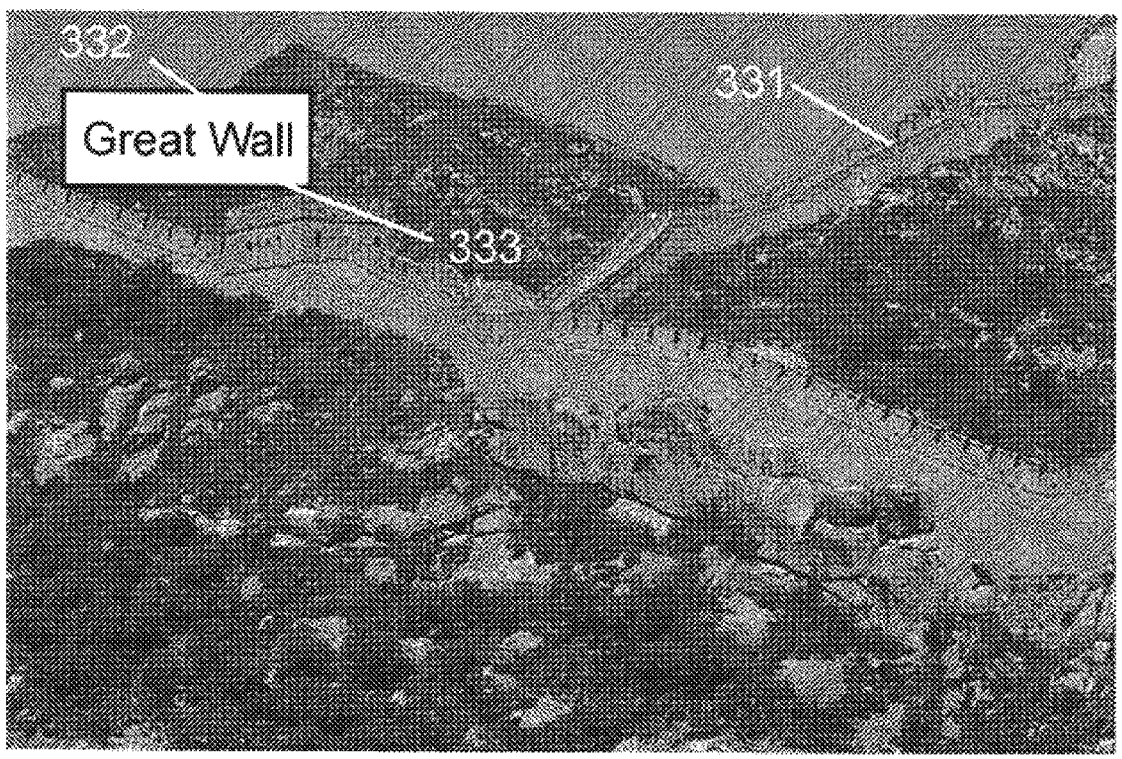
Figure 34:
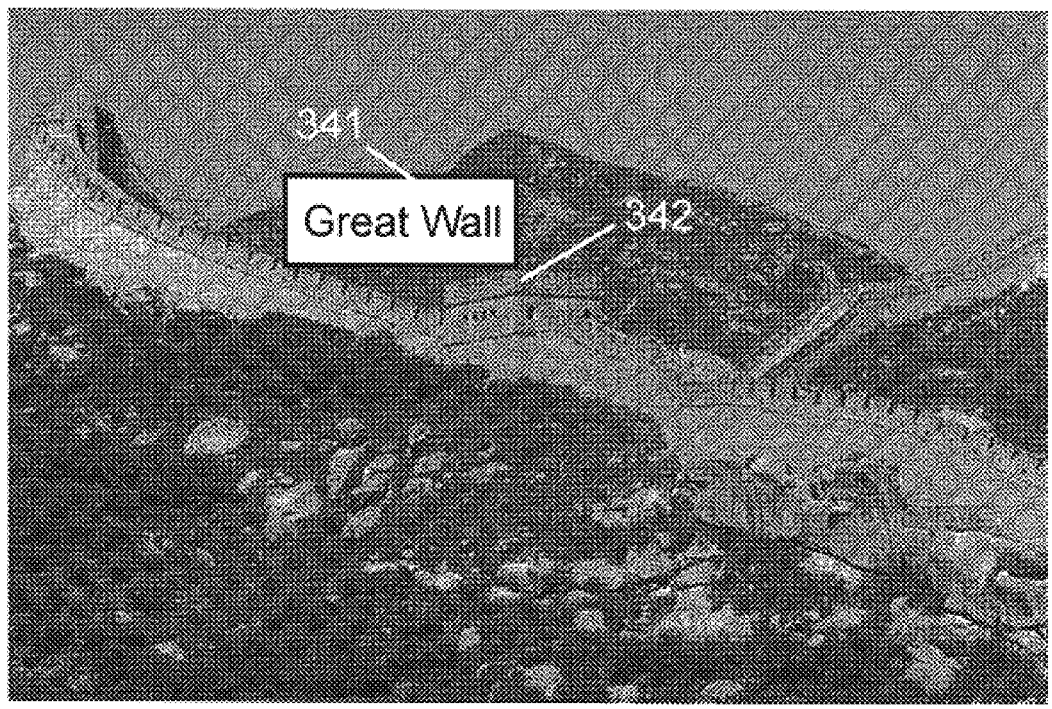
Figure 35:
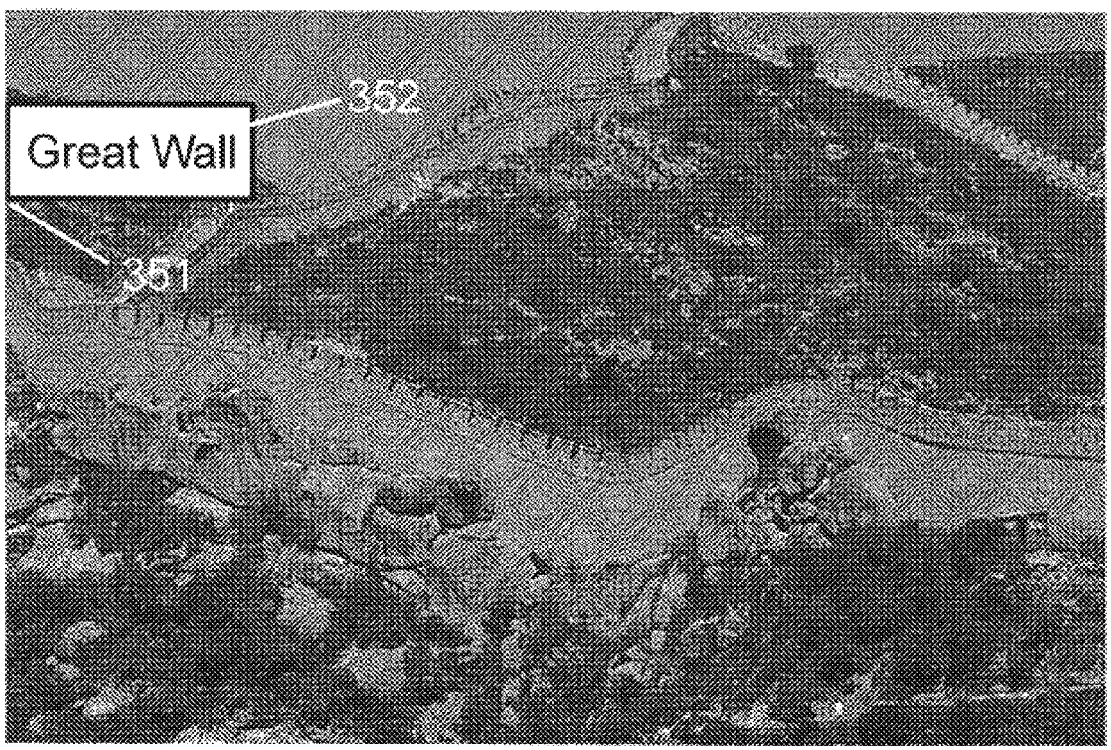
Figure 36:
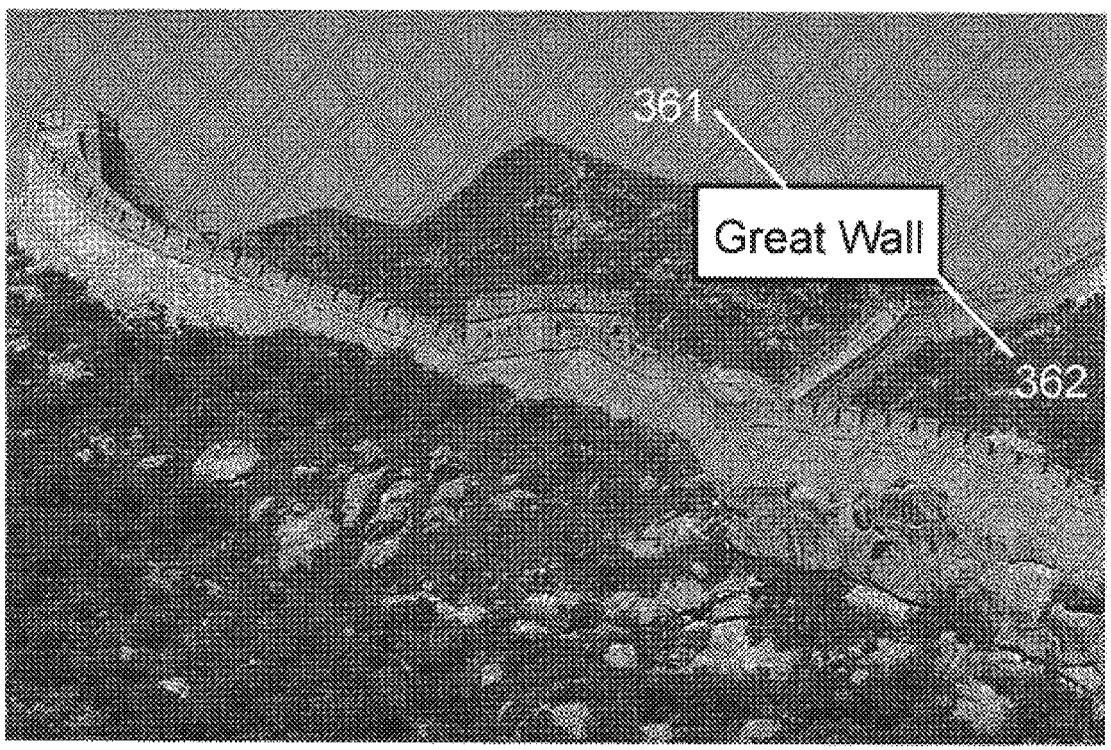

FIG. 33 illustrates a scene of the Great Wall 331 of China and a graphical user interface 332 containing text information: "Great Wall". The graphical user interface may be fixed to a point 333 associated with an object in the scene being addressed. Displacement of the pointing direction to the user's left causes objects and consequently the graphical user interface to appear to shift right. FIG. 34 shows an image where the pointing direction of the computer vision system has been shifted a few degrees causing the graphical user interface 341 to move closer to the center of the display field as it remains fixed to the point associated with the real object 342. At this location, the graphical user interface edges are far from the display field edges. However, if a large displacement were made the edges would finally become collocated therewith. FIG. 35 shows an image where a large displacement to the right has caused the edge of the display field 351 to "acquire" the graphical user interface 352 and "unlock" it from the point (no longer shown) which it was associated. Continued displacement to the right causes the graphical user interface to move with respect to the scene until the pointing direction displacement is changed again to the left. A displacement to the left causes the graphical user interface to become "locked" to a new point in the scene. FIG. 36 shows an image where the graphical user interface 361 no longer follows the edge, but is "locked" to a new point 362 in the scene. This type of graphical user interface is particularly useful when a user wants the graphical user interface to always be present in the display field but does not want it at the boresight.

Now, many types of graphical user interfaces have been described including graphical user interfaces which relate to objects of a scene being addressed, graphical user interface which interact with geometric constructs of a surrounding, graphical user interfaces which provide magnification schemes, graphical user interfaces which interact with display field extremities et cetera. A still further new type of graphical user interface can be provided. A graphical user interface which operates to catalog and track other graphical user interfaces being used in a computer vision system. These specialized graphical user interfaces may contain positional information about other graphical user interfaces. For example, if a scene contains a plurality of graphical user interfaces distributed throughout space, it may be useful to catalog the graphical user interface in a positional diagram. A diagram may be created where the system user's position corresponds to the center of the diagram. The position of each graphical user interface can then be shown in relation thereto. In addition, for graphical user interfaces not presently within the field-of-view but having been previously "placed" in some location, the diagram could indicate their position with respect to the field-of-view in order to facilitate re-acquiring those graphical user interfaces. FIG. 37 shows an image having four graphical user interfaces therein. A first graphical user interface 371 having pointing indicia marks a particular location in the scene. A second graphical user interface 372 is "attached" to an object (Owl Mountain), the graphical user interface being merely a location label. A third graphical user interface 373 contains continuously updated date and time and is responsive to environmental conditions and information which is particular to the instant computer vision system such as: position, pointing direction, and temperature. Their positions with respect to the user might be graphically represented in a fourth graphical user interface 374 graphical user interface 374 having a circular periphery also has two radial lines which indicate the extent of the field-of-view. The center of the graphical user interface represents the user's position. Short line segments distributed about the graphical user interface correspond to the graphical user interfaces presently addressable by the computer vision system. Three are at least partially within the field-of-view and three others are outside the field-of-view.

The drawing of FIG. 38 shows a graphical user interface 381 being normally aligned with respect to the viewing direction and a second graphical user interface 382 displayed in proper perspective with respect to the scene graphical, user interface 383 is a "radar" graphical user interface which tracks and catalogs any graphical user interfaces launched and in use. Location and perspective can be represented. Line segment indicia 384 represents the normally aligned graphical user interface 381 and line segment indicia 385 represents graphical user interface 382 displayed in perspective. In some cases, it is additionally useful to supplement the radar graphical user interface with a map background. FIG. 39 shows a radar graphical user interface having a map background.

A graphical user interface can be arranged to respond to objects in a scene to proximity to an object of concern. To indicate a degree of nearness, the graphical user interface text can become more bold or faint in proportion to how near the graphical user interface is to the object it is associated with. In addition, it may change its content entirely as it approaches new objects. FIG. 40 shows a landscape scene containing a known mountain range. A graphical user interface 401 having been positioned such that its pointing indicia is at "Canary Peak" has text in a bold typeface. If the graphical user interface is repositioned by any means, to a location near, but not directly at Canary Peak, then the text in the graphical user interface 402 begins to fade to a less dense type. The further the graphical user interface is from the known point in the image, the lighter the text, graphical user interface 403 has text which is barely readable thereby reflecting its position far from Canary Peak. Continued displacement causes the graphical user interface to become nearer a second known point. As the graphical user interface crosses the midpoint between Canary Peak and Owl Mountain, the content of the graphical user interface text changes to reflect that, graphical user interface 404 shows "Owl Mountain" in light text to indicate that the graphical user interface is far from, but approaching Owl Mountain. As the graphical user interface is repositioned closer to the known point, the new text is presented in increasingly darker type (graphical user interface 405 and 406). Finally, when the graphical user interface 407 position corresponds directly with the exact position of the known point, the darkest possible text is displayed.

A similar but unique graphical user interface may have a behavior which is proportionally responsive to the degree to which the system is pointing to a particular object. FIG. 42 shows an image of San Francisco including the famous TransAmerica building. A graphical user interface 421 affixed to the building can be made to disappear slowly in proportion to the offset between the system pointing direction and the direction to the building. For example, as the vision system camera is panned away, the graphical user interface is made more transparent allowing the scene behind it to show through. FIG. 43 shows an image including graphical user interface 431 which has faded to reflect the pointing direction does not correspond to the direction of the object/graphical user interface. A nearly identical mechanism could cause the graphical user interface to shrink in size. FIG. 44 shows graphical user interface 441 which appears smaller than 421 to reflect the condition of the displacement of the pointing direction away from the TransAmerica building. A similar system allows the detail of information presented in a graphical user interface to vary as the pointing direction corresponds more closely with an object. FIG. 45 shows a graphical user interface 451 having considerable detail including: a map 452 which moves in response to changes in user's position and attitude, a video field 453 which shows the inside of the building, and push button sub-fields 454 which can be activated to find more information/interactions. When the pointing direction is panned away from the TransAmerica building, then it is anticipated that less interaction is desired. Therefore, the graphical user interface responds by displaying less information. FIG. 46 shows an image where the graphical user interface 461 has been reduced in complexity and detail in response to the new pointing direction which corresponds to other parts of the cityscape. Finally, FIG. 47 shows that a large displacement causes the graphical user interface 471 to be reduced to its simplest form.

Some specialized versions of graphical user interfaces of the invention are interactive with transceiver systems. A computer vision system may be arranged to receive electromagnetic signals (radio, IR, etc.) from transmission facilities and to return signals thereto. By way of this type of link-up, a computer vision system can communicate with systems which may be remotely located. Data and information may be exchanged between the computer vision system and the transceiver system in a way to advance simple objectives such as purchases of services including scheduling an appointment. The interface between the human user and the computer vision system/transceiver system can be provided as a graphical user interface particular to computer vision systems. An example of such arrangement follows.

Figure 48:

The image of FIG. 48 is a part of a facade of a service provider business. The facade is stationary as it is part of a building. The location may house a computer with a broadcasting and receiving facilities. The transceiver computer may be configured to communicate as a complement with a plurality of computer vision systems via a communication protocol. Similarly, a computer vision system may visit various facades which may communicate with it. When the facade is addressed by a computer vision system, graphical user interfaces provide a facility for user interaction therewith. This may include many various types of interaction, one example is illustrated here.

Figure 49:
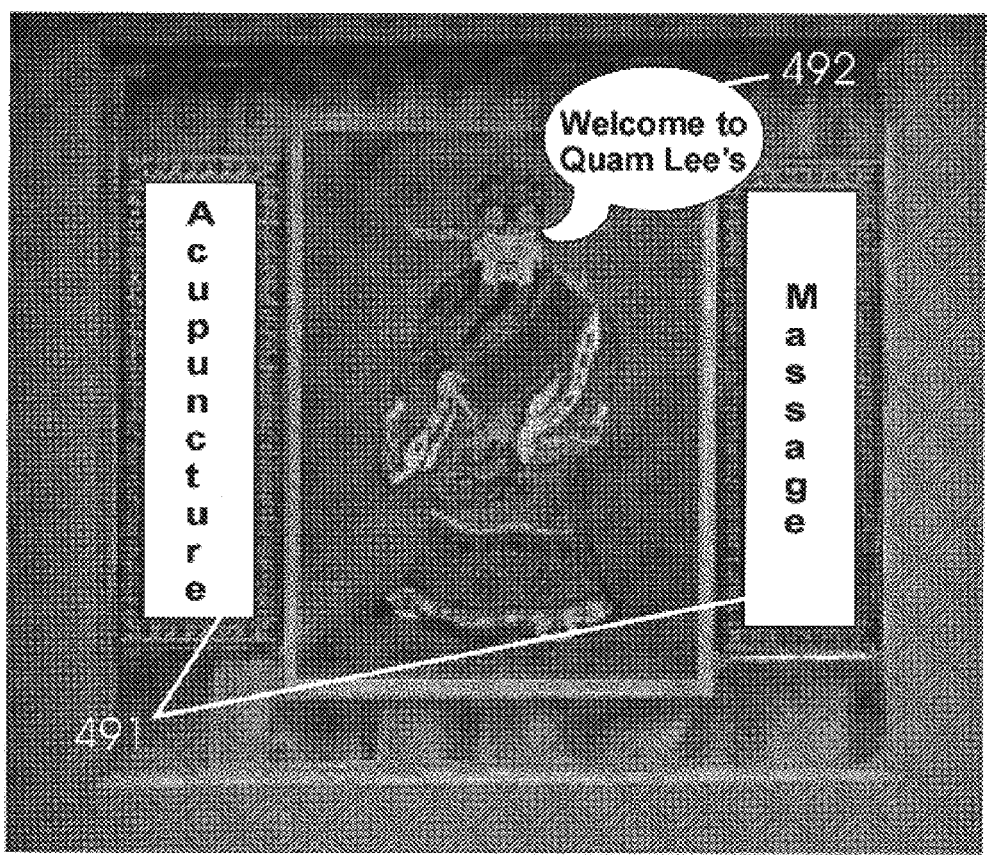
Figure 50:
Figure 51:
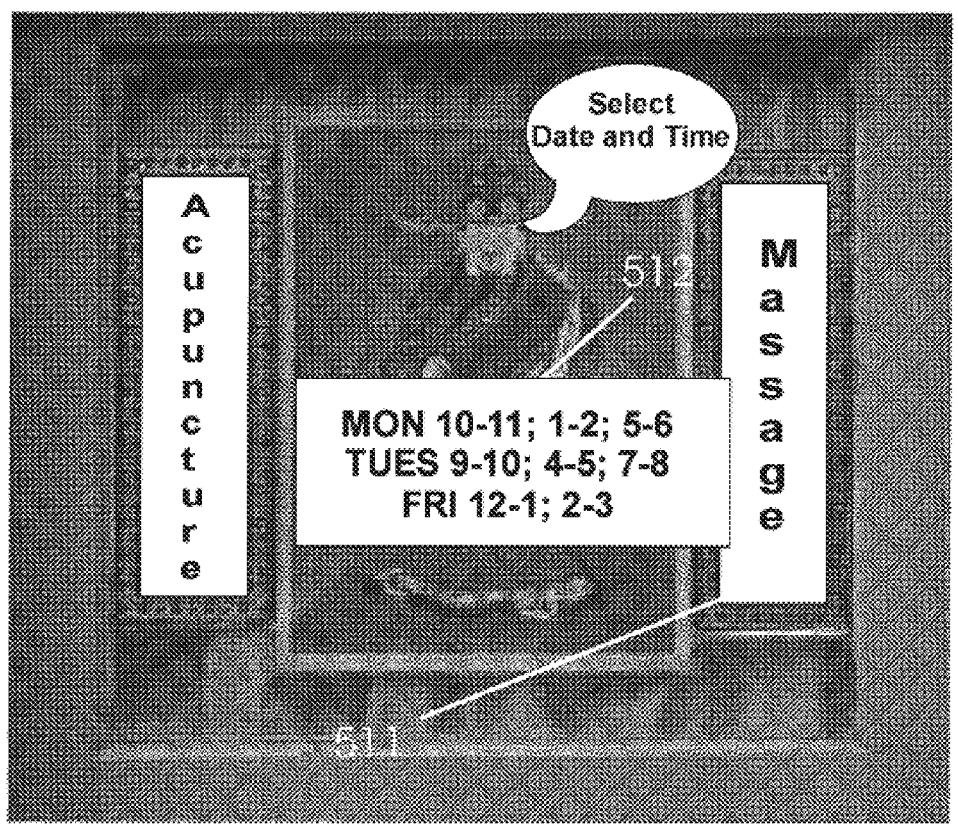

FIG. 49 shows how the facade may look to an English speaking computer vision system user. Signs originally written in the Chinese language have been translated into the English language words "Acupuncture" and "Massage" in the graphical user interfaces 491. In addition, a salutation including instructions is provided via graphical user interface 492. By clicking on either graphical user interface 491, a response is affected which provide for additional input. FIG. 50 is shown with an image of the facade having graphical user interface 501 which offers a full body massage for $45 and a push button mechanism for setting an appointment, graphical user interface 502 acknowledges the prior choice and may offer other pleasantries or instructions. FIG. 51 shows how a graphical user interface 511 might be presented in response to activating the push button 503. The information associated with sub-fields 512 is dynamic with the scheduling of the massage parlor's bookings and is expected to change from time-to-time as others make appointments. The computer of the broadcasting facility responds to bookings by closing time periods as they are booked and offering only available appointments. In this way, user's of computer vision systems who later approach the facade will have their graphical user interfaces respond appropriately. This illustrates clearly that data presented in graphical user interfaces of computer vision systems may be responsive to broadcasting systems. In addition, these broadcasting systems may respond to transmissions from computer vision systems.

Figure 52:
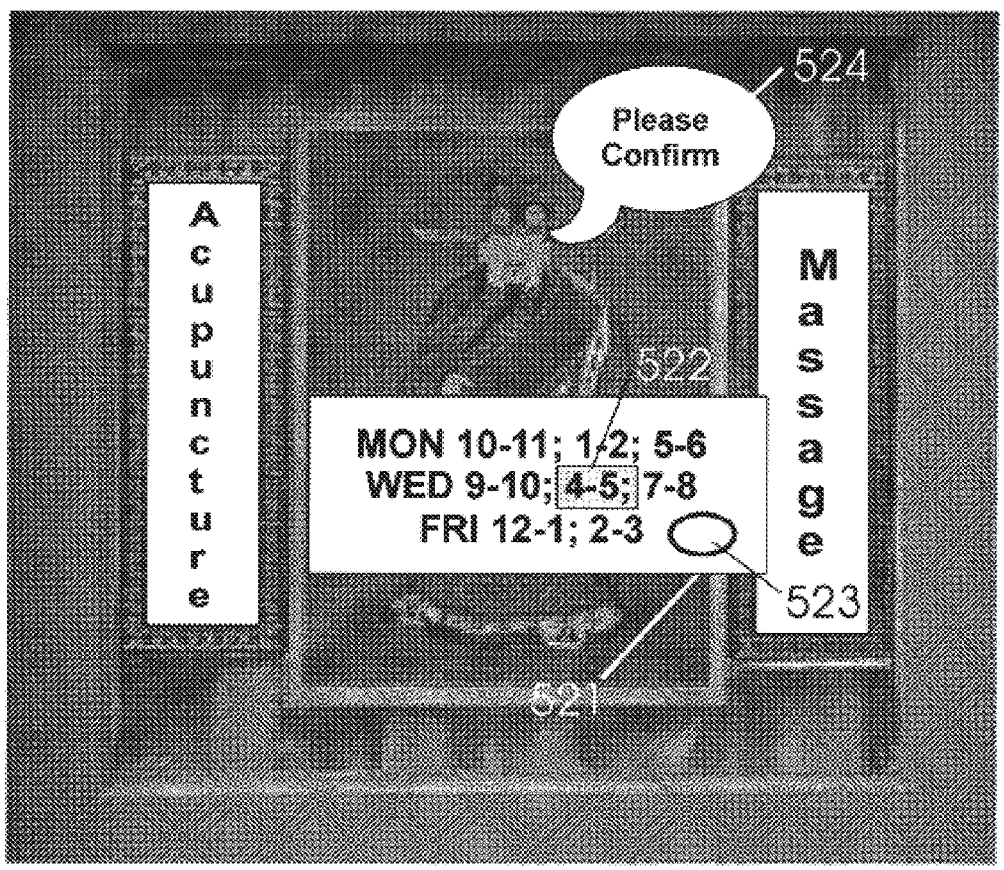

FIG. 52 shows a graphical user interface displaying the result of choosing a sub-field 522 associated with a time slot 4pm–5pm. This action causes an additional graphical user interface 523 to ask for confirmation of the booking graphical user interface 524 provides further instruction by way of text. Confirmation by clicking on the graphical user interface 523 allows the computer at the building to be manipulated by a computer vision system user. The user may approach other institutions operating transceiver stations with the necessary protocol to interact with those business with the same computer vision system.

Figure 53:
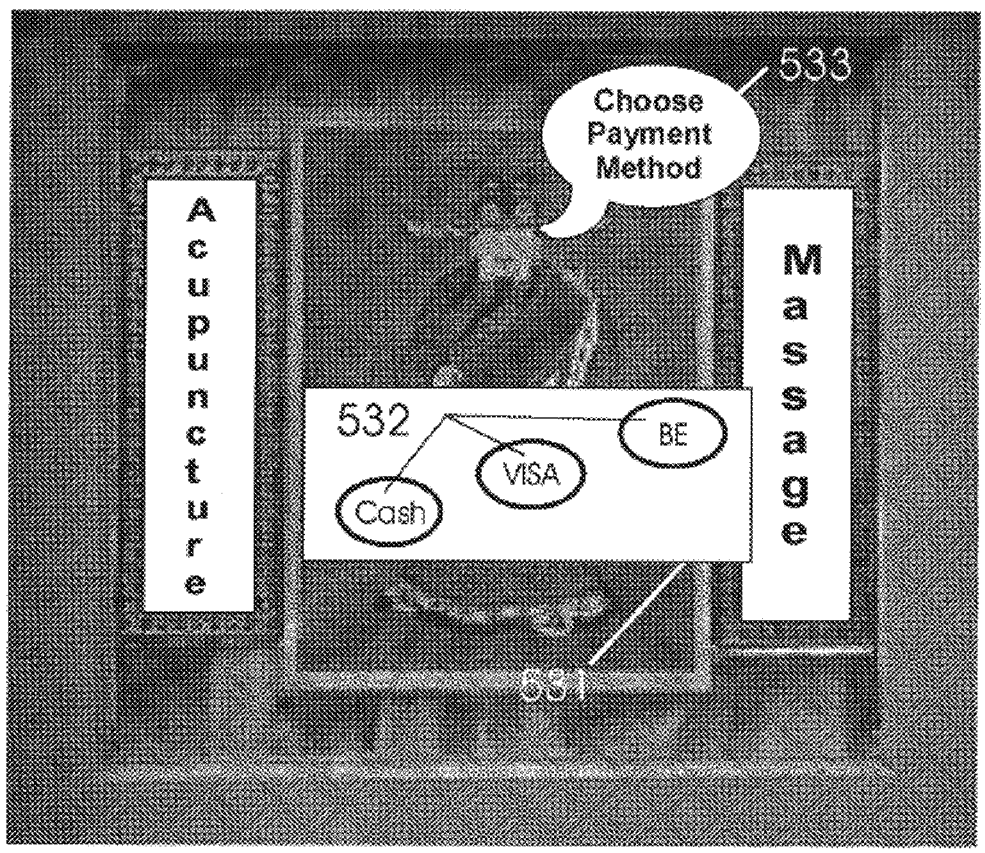
Figure 54:
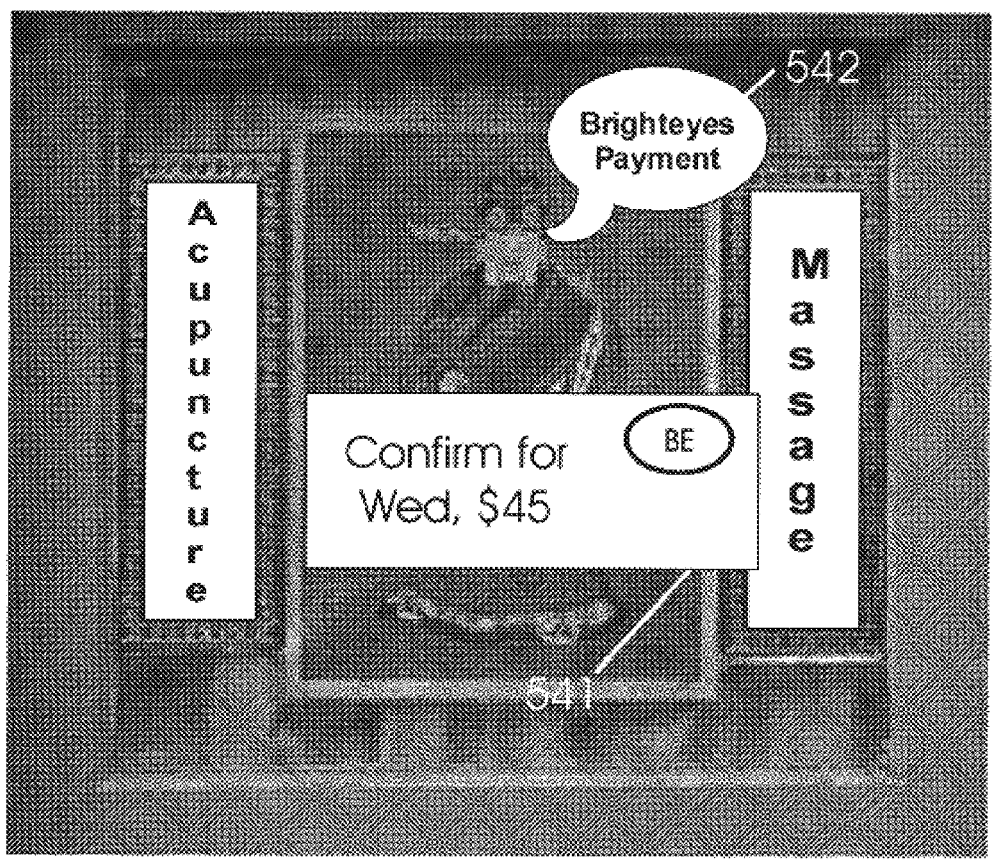

FIG. 53 shows graphical user interface 531 having three sub-fields 532 which correspond to accounting information. This information is used by the transceiver station to receive money transfer in response to user interaction with graphical user interfaces of the invention, graphical user interface 532 provides confirmation of the purchase, and further instructions. FIG. 54 shows a final image having a graphical user interface 542 which provides similar summary remarks along with additional pleasantries.

Although the combination of the transceiver station and computer vision system may be envisaged as a single device for purposes of defining an invention, the computer vision system having pre-defined protocol and being enabled with graphical user interface capability is also considered a complete device as it stands alone.

It has been clearly shown that graphical user interfaces can be arranged to be responsive to position and attitude determination in many ways. It is important to understand that the few examples presented here are only representative of the many thousands of ways to incorporate position and attitude response mechanisms into various graphical user interface devices. What is considered to be the essence of the invention is the graphical user interface for a computer vision system.

FIG. 41 shows a block diagram of some system elements as they relate to each other. Particularly, a display field 410 is a planar region operable for producing thereon a light emissive pattern. A field region 411 is a fractional portion of the display field which contains image information therein. A sub-field region 412 is a fractional part of the field region and may similarly contain image information therein. A camera 413 transmits an electronic image to a computer 414 having an image processor 415. Position and attitude determining means 416 and 417 respectively produce a signal which drives a computer memory 418 having output to the image processor. Position and Attitude signals and information may further be transmitted via an interconnect 419 to a response mechanism 4110 of a graphical user interface generator 4111. A composite image comprised of optically acquired information, computer generated image information and finally a graphical user interface is transmitted along communication line 4112 to the display where the composite image is displayed in the display field.

While one will surely appreciate that, standing alone, a graphical user interface is a device, it can however be beneficial to envisage the combination of a computer vision system with a graphical user interface as a single device. This is due to the fact that elements of the computer vision system are intricately related to elements of the graphical user interface. In fact, it is difficult to say they are separate as they share some elements. For example, the pointing direction of the camera can serve as a pointer of the graphical user interface for "point-and-click" operations. The graphical user interface field region is necessarily a subset of and is coplanar with the display's planar image field. Since the connection between computer vision systems and graphical user interfaces is an intimate one, one might present the combination as a single device. Accordingly the invention provides:

an apparatus including the combination of a computer vision system with a graphical user interface comprised of:

a camera;

a display;

an attitude determining means;

a position determining means;

a computer, and a graphical user interface, said camera having an optical axis and an image plane whereby an image of a scene being addressed by the computer vision system is formed in the image plane when the optical axis is pointed into the direction of the scene;

said display having a planar image field with a normal direction associated therewith, the normal direction being aligned with the optical axis of said camera, or alternatively aligned with an angular offset;

said attitude determining means having a reference direction colinear with the optical axis of said camera;

said position determining means having a reference point collocated with the intersection of the planar image field and the reference direction of the attitude determining means;

said computer being electronically coupled to said camera, said display, said attitude determining means, and said position determining means;

said graphical user interface having a field region and a periphery bounding the field region, the field region being a fractional portion of the planar image field of the display.

The relationship between the graphical user interface and elements of the computer vision system can be further defined as follows:

An apparatus described above, additionally comprising:

a sub-field region; a cursor; and a switch, said sub-field region being a fractional portion of said field region, the sub-field having a periphery and an interior area, said cursor being indicia movable about the planar image field of the display including the field region and sub-field region of the graphical user interface, said switch having a closed condition and an open condition being in electronic communication with said computer, operable for activating an action when the switch is simultaneously in the closed condition while said cursor is collocated with the interior area of the sub-field in the display field, thereby enabling the computer to be responsive to "point-and-click" operations.

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

What is claimed is:

1. An apparatus for generating graphical user interfaces, the apparatus comprising:

an attitude determining means;

a position determining means;

a computer;

a graphics generator; and a display, said computer being electronically coupled to said display, graphics generator, and attitude determining means, said graphics generator being responsive to said attitude and position determining means.

2. An apparatus of claim 1, further comprising a switch coupled to said computer, said switch being operable for allowing a user to select a position and attitude measurement at an instant in time.

3. A graphical user interface for a computer system, the computer system having a computer; position and attitude determining means; and a display, said graphical user interface being comprised of:

a field region; and a periphery, said field region being an area fractional portion of the display field enclosed by said periphery operable for displaying image and graphical information while a scene is being addressed by said computer system.

4. A graphical user interface of claim 3, additionally comprising a response mechanism, said response mechanism being in communication with said field region whereby said response mechanism operates to change the information content of the graphical user interface.

5. A graphical user interface of claim 4, said response mechanism electronically connected to said position and attitude means whereby position and attitude information is transmitted to said response mechanism and the content of the graphical user interface is responsive to position and attitude determinations.

6. A graphical user interface of claim 4, said graphical user interface additionally comprising a sub-field region, said sub field region being responsive to a cursor.

7. A graphical user interface of claim 6, said cursor being indicia corresponding to a system pointing direction.

8. A graphical user interface of claim 4, comprising a sub-field region responsive to the position of the computer vision system.

9. A graphic user interface of claim 8, comprising pointing indicia with a reference point.

10. A graphic user interface of claim 9, comprising a sub-field region responsive to the location of the reference point with respect to an image being displayed.

11. A graphical user interface of claim 3, said periphery corresponding in shape to a three dimensional object in the scene as it appears in perspective from the point-of-view of the computer system.

12. A graphical user interface of claim 3, further having indicia, for example a color highlighted region responsive to the location of the reference point with respect to the image of the scene being addressed.

13. A graphical user interface of claim 3, said field region contains a plurality of sub-fields each contained entirely within the periphery of said graphical user interface.

14. A graphical user interface of claim 13, said plurality of sub-fields comprises at least one sub-field which corresponds in shape to a three dimensional object in the scene being addressed as it appears from the point-of-view of the computer system.

15. A graphical user interface of claim 3, comprising indicia in the shape of a polygon having at least three sides, each side of the polygon corresponding to a side of the periphery of the field region or the boundary of the display field, the periphery of the field region corresponding to a physical feature of the scene being addressed as it appears from the point-of-view of the computer system.

16. A method of displaying a graphical user interface in a computer system comprising the steps:
  addressing a scene with a computer system;
  determining the position and attitude of the computer system;
  generating a graphical user interface in accordance with said position and attitude determination; and
  displaying the graphical user interface as an image.

17. A method of claim 16, the graphical user interface being dynamically movable with respect to the display field.

18. A method of claim 17, comprising the steps:
  engaging the graphical user interface with a cursor;
  activating a switch;
  dragging the graphical user interface across the display field while holding the switch active; and
  releasing the switch.

19. A method of claim 18, said releasing the switch causes the graphical user interface to be locked to a point in the display field whereby the graphical user interface is associated with a position corresponding to a point in a displayed image.

20. A method of claim 18, said releasing the switch causes the graphical user interface to be locked to a direction in the display field whereby the graphical user interface is associated with a direction of the compass.

21. A method of claim 16, the 'generating a graphical user interface' step being further defined as providing a graphical user interface having associated therewith a plane and normal direction, associating the normal direction with a particular direction in space and displaying the graphical user interface in perspective with respect to the point-of-view of the computer.

22. A method of claim 17, where 'dynamically movable' refers to movable about a reference point and is realized executing the following steps:
  locking a graphical user interface point to a point in an image;
  engaging the graphical user interface with a cursor whereby the cursor is caused to become co-located with the interior region of the graphical user interface;
  activating a switch which causes the cursor to become locked to the field region of the graphical user interface;
  advancing the cursor and consequently the field region about a curve; and
  deactivating the switch causing the cursor to be released from the field region.

23. A method of claim 17, where 'dynamically movable' refers to movable about a display field and is realized executing the following steps:
  engaging the graphical user interface with a cursor to cause the cursor to become co-located with the interior area of the graphical user interface;
  activating a switch to cause the cursor to become locked to the field region of the graphical user interface;
  advancing the cursor and consequently the field region in any direction in the plane of the display field but without limits of a preselected area; and
  deactivating the switch causing the cursor to become released from the field region.

24. A method of claim 17, where 'dynamically movable' refers to movable about a display field and is realized executing the following steps:
  tracking an object moving in a scene;
  maintaining the position of the graphical user interface with respect to the moving object.

25. A method of claim 17, where 'dynamically movable' refers to movable with respect to the attitude of the computer system whereby the graphical user interface is displayed on a direction defined by the half-angle between the attitude of the computer system and a reference direction.

26. A method of claim 17, where 'dynamically movable' refers to movable within a plane in the scene being addressed which is movable within a plane in space such that panning of a reference direction causes the field of the graphical user interface to advance in the plane such that it has an angular appearance as the pan angle approaches 90 degrees.

27. A method of claim 16, said periphery is expanded in size such that it increases in size while the image behind remains the same size.

28. A method of claim 16, said periphery remains constant providing for an apparent size.

29. A method of claim 16, said periphery being defined by a click-and-drag process.

* * * * *